United States Patent
Gu

(10) Patent No.: US 11,354,915 B2
(45) Date of Patent: Jun. 7, 2022

(54) IMAGE EXTRACTION METHOD IMPORTING INTO SDL MODEL

(71) Applicant: Apollo Japan Co., Ltd., Yokohama (JP)

(72) Inventor: Zecang Gu, Yokohama (JP)

(73) Assignee: APOLLO JAPAN CO., LTD., Kanagawa (JP)

( * ) Notice: Subject to any disclaimer, the term of this patent is extended or adjusted under 35 U.S.C. 154(b) by 299 days.

(21) Appl. No.: 16/598,314

(22) Filed: Oct. 10, 2019

(65) Prior Publication Data
US 2020/0226391 A1 Jul. 16, 2020

(30) Foreign Application Priority Data
Oct. 11, 2018 (CN) .......................... 201811212126.X

(51) Int. Cl.
| G06V 20/58 | (2022.01) |
| G06V 20/56 | (2022.01) |
| G06T 7/90 | (2017.01) |
| G06N 20/00 | (2019.01) |
| G06F 17/16 | (2006.01) |
| G06F 17/18 | (2006.01) |

(52) U.S. Cl.
CPC ............ G06V 20/588 (2022.01); G06F 17/16 (2013.01); G06F 17/18 (2013.01); G06N 20/00 (2019.01); G06T 7/90 (2017.01)

(58) Field of Classification Search
CPC ...... G06K 9/00798; G06T 7/90; G06N 20/00; G06F 17/16; G06F 17/18
See application file for complete search history.

(56) References Cited

U.S. PATENT DOCUMENTS

| 7,912,628 B2* | 3/2011 | Chapman ............. G08G 1/0141 701/117 |
| 2009/0097733 A1* | 4/2009 | Hero, III ............. G06K 9/6252 382/133 |

(Continued)

OTHER PUBLICATIONS

Y. Yuan, Z. Guoqiang, C. Zhenwei and G. Yudong, "Color Image Quality Assessment with Multi Deep Convolutional Networks," 2019 IEEE 4th International Conference on Signal and Image Processing (ICSIP), 2019, pp. 934-941, doi: 10.1109/SIPROCESS. 2019.8868333. (Year: 2019).*

*Primary Examiner* — Fayyaz Alam
(74) *Attorney, Agent, or Firm* — Juan Carlos A. Marquez; Marquez IP Law Office, PLLC

(57) ABSTRACT

The invention refers to an image extraction method importing into SDL model in the field of information processing, and is characterized in that the target image are labeled artificially for plural times on computer data. The target image that has been labeled to be extracted for plural times will obtain the maximum probability value and scale of each parameter constituting the target image by machine learning. And the target image can be obtained from the sample computer data according to the maximum probability value or its scale range. The implementation effect of this method is to extract the required image arbitrarily from an image, eliminate the interference of background image affecting the result of image recognition, and improve the effect of image processing and the accuracy of image recognition, which is a new image processing algorithm that subverts the traditional binaryzation algorithm.

6 Claims, 15 Drawing Sheets

(56) References Cited

U.S. PATENT DOCUMENTS

2018/0137409 A1\* 5/2018 Gu .................. G06N 3/0481
2018/0268284 A1\* 9/2018 Ren .................. G06N 3/04
2019/0206026 A1\* 7/2019 Vemulapalli .......... G06N 20/00

\* cited by examiner

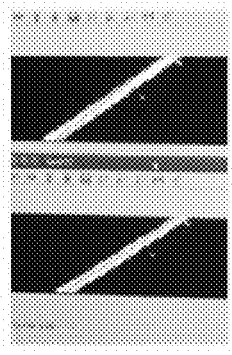 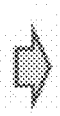 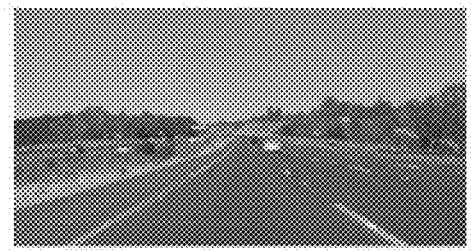
FIG. 8(a)　　　　　　　　　　　　　　FIG. 8(b)
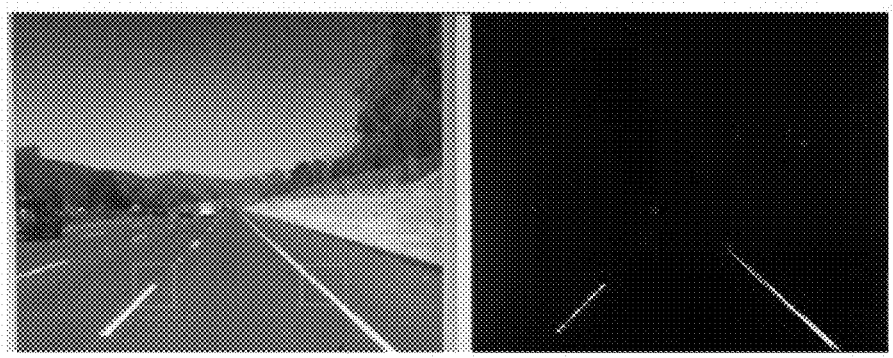
FIG. 9(a)　　　　　　　　FIG. 9(b)

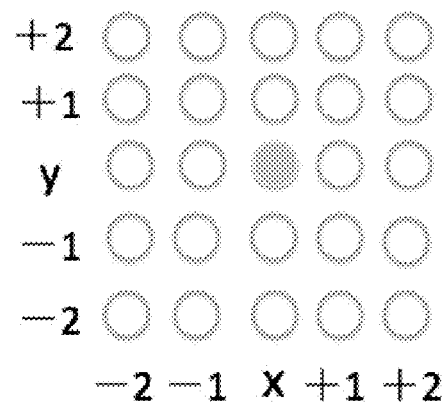
FIG.10
 
FIG. 11(a)　　　　　　　　FIG. 11(b)

IMAGE EXTRACTION METHOD IMPORTING INTO SDL MODEL

TECHNICAL FIELD

This application claims all benefits accruing under 35 U.S.C. § 119 from China Patent Application No. 201811212126.X, filed on Oct. 11, 2018 in the State Intellectual Property Office of China, the entire contents of which are hereby incorporated by reference.

The invention refers to an image extraction method importing into the SDL model in the field of artificial intelligence.

BACKGROUND ART

Automatic drive cars are now the main battlefield for the application of artificial intelligence, but it is regrettable that the research results of special machine learning for the control problems in automatic drive cars are very few and have not attracted widespread attention so far.

Japan's famous Toyota Company has released a patent for "Driving Direction Presumption Device" (Patent Literature 1), proposing that, according to sudden situations during the automatic drive process, through the machine learning algorithm of the inverse transfer neural network of the artificial intelligence, even if the driver does not respond to the situation, the vehicle is capable of choosing the driving state automatically in order to avoid traffic accidents and so on.

On Oct. 9, 2016, in terms of the topic of "How to cross the barrier of automatic drive" explained by a commentator named Muroyama Tetsuya from NHK, Japan, he also raised a few issues that are currently unsolvable in the automatic drive system:

Conflict and difficulty of man-machine judgment: In the automatic drive experiment carried out by Google in February of 2019, when the Google car turned right, there was a sand pile obstacle in front of it. When the Google car switched to the right lane, just then a bus from the right lane came from behind, and the bus driver thought the Google car would brake quickly, but never thought it would switch to the right lane, and so a serious traffic collision accident occurred.

The difficulty of man-machine sensory fusion for vehicle distance selection: According to a company's survey, 41% of drivers who encountered an automatic drive car on the road thought it was better to be farther away from it, but some drivers thought it was better to follow it from a fixed distance, or to be closer to it, while the others wanted to catch up with the automatic drive car in front of them out of the curiosity. This refers to how to solve the problem of man-machine sensory fusion and how to choose driving nearest to humans as an automatic drive car, which becomes a difficult problem of automatic control.

The transfer problem of man-machine rights: In the transformation stage of man-machine operation, the consciousness between human and machine cannot be delivered. For example, in case of an emergency, in the moment necessary to switch from automatic drive to manual drive, the emergency plan selected by the automatic drive is different from that of manual drive, which is likely to cause an accident or miss the opportunity.

Trolley problem: How is the number of victims minimized in an emergency? This is the famous Trolley problem and involves both complex ethical and technical difficulties. In the automatic drive theory of machine learning, no valuable solutions have been proposed so far.

In March 2018, Uber's automatic drive car bumped into people, which exposed the contradiction of how to solve the problem of safety driving and comfortable driving in the development of automatic drive cars, and the setting problem of threshold values for determining obstacles. (See Non-Patent Literature 2)

Enough drive test mileage has been accumulated to circle the earth and test mileage being accumulated now is expected to encompass the world. The Google automatic drive car that is about to be put into commercial operation (August 2018) is exposed to exhibit the problem of turning in the doorway again. (See Non-Patent Literature 3).

A thesis on "Automatic Drive Train by Fuzzy Predictive Control" published by Oshima Hiroyasu from HITACHI (see Non-Patent Literature 4) proposes that automatic driving of a train is capable of being achieved through the rule base of fuzzy inference.

"Automatic Train Driving System by Using Predictive Fuzzy Control" (Non-Patent Literature 5) published by Yasunobu Seiji of University of Tsukuba proposes that the traditional PID regulation is capable of accurately controlling the operation of automatic driving of a train, but the smooth walking is not only the key of automatic driving, but also the key to making passengers comfortable. Also, the core problem of automatic driving is a multi-purpose control problem wherein attention should be paid to safety, running speed, travel time between stations, comfort, power consumption, and stop accuracy.

PATENT DOCUMENTS

Non-Patent Literature

[Patent Literature 1] (Special Opening 2008-225923)
[Non-Patent Literature 1] http://www.nhk.or.jp/kaisetsu-blog/100/255089.html
[Non-Patent Literature 2] http://www. sohu.com/a/225962192_100083734
[Non-Patent Literature 3]
https://baijiahao.baidu.com/s?id=1610113338436012375&wfr=spider&for=pc
[Non-Patent Literature 4]
https://www.jstage.jst.go.jp/article/ieejeiss1987/109/5/109_5_337/_pdf
[Non-Patent Literature 5]
http://ttt.akiba.coocan.jp/yasunobu/edu/intconthtms/text/Sic07a_trainATO.pdf#search=%27 予見 ファジィー 制御列車自動運転システム %27

The above (Patent Literature 1) uses an artificial intelligence neural network algorithm. However, in the neural network algorithm, the information of the objective function is carried on large number of data sets of weighted values and threshold values, which, in the process of learning, needs to adopt the method of exhaustion to test all states in order to get the best solution. The total number of times to be combined is $\{(W \times T)^n\} \times P$, wherein n is the node number of one layer of a neural network, and P is the layer number of the neural network. The computational complexity of such a high index makes the computation huge and the hardware overhead is huge, which belongs to the problem of solving small tasks by a large model. Furthermore, as a remedy, the probability gradient descent method, referred to as SGD, is used in the loss function for in-depth learning effect, and the training value obtained is only a local optimum solution, so it is inevitable to have "black-box" problems. The threshold value in the neural network model is defined artificially, which has nothing to do with the neural network mechanism of a human brain, and the stimulation signal mechanism of a cranial nerve can't be reflected in the traditional neural network model at all. The mechanism that allows a human brain to make different judgments according to the excitation degree produced by the nerve signals of neurons is not reflected in the current neural network models and so on, and the traditional neural network models cannot be widely used. Now, in the stage of deep learning, compared with the traditional neural network, only the number of hidden layers has increased, which makes the calculation more complex, so the fatal black-box problem of a traditional neural network can't be solved. Thus, there will be hidden danger in the application of such to an automatic drive car, and therefore, it's difficult to look forward to the prospect of applications.

The above (Non-Patent Literature 1) mentioned that "Conflict and difficulty of man-machine judgment", "The difficulty of man-machine sensory fusion for vehicle distance selection", "The transfer problem of man-machine rights" and "Trolley problem" should be the problems required to be solved in the automatic drive car application of artificial intelligence and should be the core problem of artificial intelligence, but no widespread attention has been paid at present.

The above (Non-Patent Literature 2) and (Non-Patent Literature 3) revealed the traditional control method adopted by Google and most of the world's best-known car manufacturers who have been stagnating in the development of automatic drive cars for nearly a decade. The NP problems in the field of control occurred because of the high complexity of automatic drive cars and if the NP problem cannot be solved, the progress of automatic drive cars will never be achieved.

The above (Non-Patent Literature 4) mainly solves the problem of automatic driving of a train and the rule base of fuzzy inference is proposed to be used to realize the automatic driving of a train. However, the establishment of a huge knowledge base requires a large-scale manual construction of the rule base. Moreover, it can only solve within two or three objective functions and is difficult to be used in an automatic drive car.

Although the above-mentioned (Non-patent literature 5) proposes a multi-purpose fuzzy control, also because the use of fuzzy control in corresponding to the control of a more objective function is not well-established, it still remains in the individual control for each specific objective function. In particular, the fuzzy control used in the objective functions such as man-machine sensory fusion, safety, energy saving and comfort in the automatic drive car, and simultaneous control of multiple objects, because different objective functions are not in the same space, it is difficult to find a common optimized control point. Even if being mapped to the same space, it is impossible to get a common optimal point of intersection of different objective functions by traditional methods. Therefore, it is necessary to find the redundancy between the multi-objective optimal control and to truly realize the multi-objective optimal control. Therefore, it is necessary to solve the establishment of a machine learning model for multi-objective control.

SUMMARY OF THE INVENTION

Problem to be Solved by the Invention

The first purpose of the invention is to propose a more powerful automatic machine learning model based on composite model to improve the computing ability of the machine learning in order to realize the image approximation of machine learning without training.

The second purpose of the invention is to enable the automatic drive car to learn excellent driving skills from a good driver so as to improve the control level of the automatic drive car, reduce the complexity of the automatic drive car control, and avoid the NP problem presented on the control of a traditional automatic drive car.

The third purpose of the invention is to put forward a model of a machine decision-making mechanism, which can realize "machine consciousness" for complex road conditions and provide optimized state instruction for an automatic drive vehicle to operate decisively and then the automatic drive car can categorize as "Smart Gains" data according to state instruction.

The fourth purpose of the invention is to propose a multi-purpose optimal control machine learning model and system device suitable for an automatic drive car, which can carry out the control of the best machine learning model for multi-objective functions including safe driving, fast arrival, comfortable riding, energy saving and so on.

The fifth purpose of the invention is to propose an image extraction method importing into an SDL model, which can create a new way of machine learning image processing so as to improve the accuracy of image processing and image recognition.

The sixth purpose of the invention is to propose a calculation method of distance that can span the Euclidean space and the probability space, and this distance formula satisfies the conditions of distance scale of non-negative, non-degenerate, symmetry and triangular inequality.

The seventh purpose of the invention is to propose a calculation method of fuzzy event probability measurement that can span the Euclidean space and the probability space, which can resolve the problem of classification between data interwoven by probability distribution, make micro-uncertain information and unstable information to produce definite, stable and valuable information through macro-integration, and then realize the unexpected application effect.

Means to Solve the Problem

In order to achieve at least one of the above-mentioned purposes, the invention provides the following technical scheme: An image extraction method importing into SDL model comprises the part of eigenvector generation and the part of image extraction, and is characterized in that:

(1) The image data to be extracted is separated from the original image data by human intervention, and includes color information, gradation value information, edge information, frequency information, pattern information, and spatial relation information of the image to be extracted. A complex feature value based on at least one image information is obtained, wherein the feature vector of the image to be extracted in the probability space is used to perform machine learning of the Gaussian process (Multi-Agent) of the maximum probability Gaussian process using each feature value of the images to be extracted. The result is registered in the database;

(2) The part of image extraction: For the sample image data, the eigenvector is determined according to the above methods; the distance between the eigenvector of the sample image and each eigenvector registered in the database is calculated, and the gray-scale value of each color of the required image learned in the eigenvector with the smallest distance is found.

Moreover, the described distance refers to the distance scale of at least one space included in Euclidean space and probability space. Moreover, the described maximum probability value is the iteration result of machine learning for probability scale self-organization.

Moreover, the described maximum probability space is the space enclosed by the maximum probability scale obtained from the iteration results of machine learning for probability scale self-organization.

Moreover, the described maximum probability distribution comprises the maximum probability value and the maximum probability scale that are obtained from the iteration result of machine learning for probability scale self-organization.

Moreover, the gray-scale value of each color of the image required to be extracted is the main eigenvalue, which refers to establishing the difference between the gray-scale value of each color of the required image and that of other images; or the ratio between the gray scale of a certain color of a lane and the maximum gray value of the background image; or the ratio between the gray scale of a certain color of the lane and the minimum gray-scale value of the background image; or through confrontation learning, the gray scale of a certain color of the lane, the maximum probability value of the gray-scale value which is not the closest to the lane but less than the lane, and the maximum probability value of the gray-scale value which is not the closest to the lane but more than the lane are found out, and confrontation learning is carried out between two values by the lane and the probability distribution of the difference between the lane and these two values are found out.

The invention proposes an image extraction method importing into the SDL model in the field of information processing. The implementation effect of this method is to extract the required image arbitrarily from an image, eliminate the interference of background image affecting the result of image recognition, and improve the effect of image processing and the accuracy of image recognition, which is a new image processing algorithm that subverts the traditional binarization algorithm.

Effect of the Invention

The invention proposes an image extraction method importing into SDL model in the field of information processing. The implementation effect of this method is to extract the required image arbitrarily from an image, eliminate the interference of background image affecting the result of image recognition, and improve the effect of image processing and the accuracy of image recognition, which is a new image processing algorithm that surpasses the traditional binarization algorithm. The embodiment of the present invention is further detailed through combination with the attached figures, but the embodiment of the present invention is illustrative, not restrictive.

BRIEF DESCRIPTION OF THE DRAWINGS

The present invention is illustrated in the accompanying drawings, wherein:

FIGS. 8(a)-8(b) are effect figures of lane line approximation by automatic machine learning;

FIGS. 9(a)-9(b) are effect figures of image extraction of lane lines importing into the SDL Model;

FIG. 10 is a method diagram for solving the derivative value of the maximum probability;

FIGS. 11(a)-11(b) are effect figures of the marginalization treatment of an image;

DETAILED DESCRIPTION OF THE INVENTION

Figure 1A:
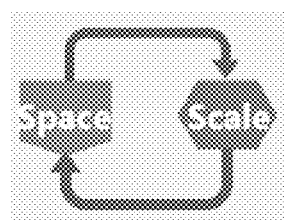
FIGS. 1(a)-1(c) illustrate a schematic diagram of the approximation method of realizing lane by automatic machine learning.
Figure 1B:
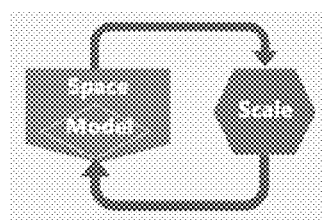
Figure 1C:
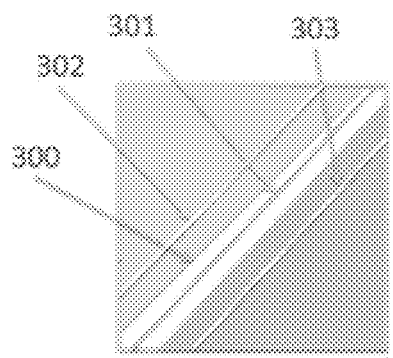

The "Super Deep Learning" model proposed in this application refers to an artificial intelligence system composed of the self-organizing machine learning model with plural probability scales, or plural automatic machine learning models, and the distance formula used to unify the Euclidean space and the probability space, or the whole or part of a model in the fuzzy event probability measure formula used to unify the Euclidean space and the probability space. FIGS. 1(a)-1(c) illustrate a schematic diagram of the approximation method of realizing lane by automatic machine learning. As shown in FIG. 1(a): This is an unsupervised machine learning model similar to the definition of probability scale self-organization. The iterative method is that in a given space, after a given scale is used to generate a necessary new space, a new scale can be generated in the new space after several such iterations, a space that converges to this scale is bound to be obtained. For example, if this scale is the scale of maximum probability, after several iterations, the space, scale and distribution of maximum probability is bound to be obtained.

As shown in FIG. 1(b): This is a more powerful automatic machine learning model based on a composite model. The specific principle is that in a given space, based on an optimized scale, or the scale of maximum information or the scale of maximum probability, after the iteration, a space of optimization, or maximum information, maximum density, or maximum probability must be produced. And in this new space, a function approximation model is added to the space and makes the effect of function approximation higher than that of the previous space. In the new space, a new scale of optimization, or a new scale of maximum information, or a new scale of maximum probability can be produced, and by iteration, a new space of optimization, or maximum information, maximum density or maximum probability can be produced. In this way, the function approximation model is used to carry out the function optimal approximation in the row space continuously, so that the function approximation effect is better. After several iterations, the function approximation effect reaches the best state, and the machine learning of this composite model can achieve the best function approximation effect without training, so it can be called automatic machine learning.

The above-mentioned optimized scale refers to genetic manipulation including fractal, or the inheritance and evolution that simulates organisms in the natural environment, or the maximum fuzzy value, or the maximum density value, or the maximum approximate value, or one of the maximum similar relational values.

For non-probability space, it also can be extended to either the Euclidean Distance scale, or the Manhattan Distance scale, or the Chebyshev Distance scale, or the Minkowski Distance scale, or the Mahalanobis Distance scale, or the Cosine scale, or the distance scale that unifies Euclidean space and the probability space, or one of the fuzzy event probability measurements that unifies Euclidean space and the probability space.

Alternatively, it also can be extended to Jaccard similarity Coefficient scale, or one of the Hamming Distance scale.

The above-mentioned maximum information refers to: maximum information entropy.

The above-mentioned scale of the maximum probability refers to: one of the maximum probability value based on the normal distribution, or multivariate normal distribution, or logarithmic normal exponential distribution, or t distribution, or F distribution, or $X^2$ distribution, or binomial distribution, or negative binomial distribution, or multinomial distribution, or Poisson distribution, or Erlang distribution, or hypergeometric distribution, or geometric distribution, or communication traffic distribution, or Weibull distribution, or triangular distribution, or Bete distribution, or Gamma distribution.

The above-mentioned models that carry out the function approximation can be linear regression approximation, optimal square approximation, least squares approximation, Chebyshev polynomial approximation, spline function approximation, interpolation polynomial approximation, triangular polynomial approximation, rational approximation, Pad approximation, etc.

FIG. 1(c) is schematic diagram of the lane approximation by automatic learning. As shown in FIG. 1(c): (300) is the lane image of the automatic drive car. The lane image is an oblique line consisting of a discrete lattice, and (301) is the central line of the discrete lattice located near the lane position. This line is obtained in the initial state by the approximation function based on the initial given space. There must be a scale in the given space and the lattice within this scale is closest to the approximation line of the lane (301), and the lattice within the scale is preserved and the lattice outside the scale is removed and then a new space can be produced. Wherein this scale is the variance of the probability distribution, and also can be the lattice density of regions enclosed by (302) and (301), or the lattice density of regions enclosed by (303) and (301), also can be the two-dimensional probability distribution of the lattice of regions enclosed by (302) and (301), or two-dimensional probability distribution of the lattice of regions enclosed by (303) and (301).

When the density is used as the scale, and when the lattice density of regions enclosed by (302) and (301), or by (303) and (301), increases, the spacing between (302) and (301), or (303) and (301) decreases. On the other hand, when the lattice density of regions enclosed by (301) and (302) or by (303) and (301) decreases, the spacing between (302) and (301), or (303) and (301) increases.

When the maximum probability distribution value of two-dimensional probability distribution is used as the scale, the two-dimensional probability distribution of rectangular region should be adopted.

Figure 2:
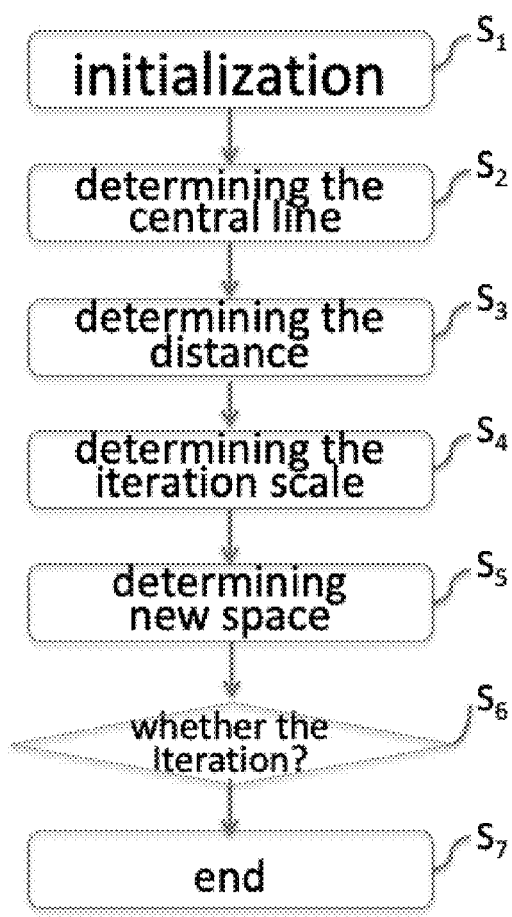
FIG. 2 shows a flow diagram of the approximation method of realizing a lane by automatic machine learning.

FIG. 2 shows a flow diagram of the approximation method of realizing a lane by automatic machine learning. As shown in FIGS. 1(a)-1(c) and FIG. 2, the processing steps of lane detection using automatic machine learning are as follows:

$S_1$ is the initialization step: Lane detection is aiming at the binary image that is transformed by the environmental image of the automatic drive car, or the lane image is extracted by machine learning from the environmental image of the automatic drive car before binarization processing of the image is carried out.

In the process of initialization, the general initial range of the lane is given, and the initial iteration range which is equal to about half of the image can be given first, and in the initial range, at least one processing sub-lane image must be included. Within the given range, the position of the lattice with the gray-scale value of 256 is set to be $x_{ij}$, $y_{ij}$ (i=1, 2, ..., n, j=1, 2, ..., m), wherein I is the result of the $i^{th}$ iteration, j is the lattice order, and the lattice order is independent of the processing result.

$S_2$ is the step of determining the central line: within the existing range of the lane produced in the initialization step of $S_1$, or within the range obtained in the iteration process, the central line (301) is obtained through the following formula.

The lattice set equal to $P_i$ (i=1, 2, ..., n) within the $i^{th}$ given range and the m lattices equal to $p_{ij} \in P_i$ (i=1, 2, ..., n, j=1, 2, ..., m) belonging to this lattice set is set up, the coordinate position of each lattice $p_{ij}$ is $x_{ij}$, $y_{ij}$ (i=1, 2, ..., n, j=1, 2, ..., m) and then the following calculations are carried out:

$$y'_i = \frac{1}{m}\sum_{j=1}^{m} y_{ij} \qquad \text{[Formula 1]}$$

$$x'_i = \frac{1}{m}\sum_{j=1}^{m} x_{ij} \qquad \text{[Formula 2]}$$

$$b_i = \frac{\sum_{j=1}^{m}(y_{ij}-y'_i)x_{ij}}{\sum_{j=1}^{m}(x_{ij}-x'_i)x_{ij}} \qquad \text{[Formula 3]}$$

$$a_i = y'_i - b_i x'_i \qquad \text{[Formula 4]}$$

$$y_i = a_i + b_i x_i \qquad \text{[Formula 5]}$$

With the use of these formulas, a lattice set $P_i$ from a given range and a lattice closest to the straight line (301) between all the lattice $p_{ij} \in P_i$ of this set can be obtained.

$S_3$ is the step of determining the distance from the lattice to the central line: for the lattice set Pi within a given range i, and for all the lattice $p_{ij} \in P_i$ (i=1, 2, ..., n, j=1, 2, ..., m) belonging to this set, and the distance from a straight line derived from $S_2$, the following calculations are carried out:

$$d_{ij} = \frac{b_i x_{ij} - y_{ij} + a_i}{\sqrt{b_i^2 + 1}} \qquad \text{[Formula 6]}$$

By judging the positive and negative of $d_{ij}$, it can be known that the pixel in a given region is the pixel in the direction of the linear regression line, and the positive or negative sign distance is determined after classification.

$S_4$ is the step for determining the iteration scale: that is, the variance $S_i^2$ and average $d_i'$ of distance from the entire lattice within the given $i^{th}$ range is determined $$d_i' = \frac{1}{m}\sum_{j=1}^{m} d_{ij} \quad \text{[Formula 7]}$$

$$S_i = 2\sqrt{\frac{1}{m-1}\sum_{j=1}^{m}(d_{ij} - d_i')} \quad \text{[Formula 8]}$$

$S_5$ is the step for determining new space, that is, the new space is obtained on the basis of the $S_i$ scale, which is solved with $S_4$ by adopting iteration formula. Considering that Formula 7 and Formula 8 are one-dimensional probability distributions, the distortion of function approximation will appear, so the density of the lattice in the region enclosed by the linear regression line (301) and the $S_i$ scale (302) or (303) of Formula 8 can also be used here as the iteration scale for generating new space. When the density increases, the spacing between (302) and (301) or (303) and (301) decreases, on the contrary, the spacing between (302) and (301) or (303) and (301) increases.

Another method is to calculate the iteration scale directly by using the two-dimensional rectangular probability distribution formula, so as to generate a new iteration space.

$S_6$ is the step to determine whether the iteration is complete: if "no", then jump to $S_2$ to continue the iteration process, and if "yes", then enter the end iteration of $S_8$. The judgment is based on whether the number of iterations used reaches the maximum number of iterations. Alternatively, the judgment is based on whether the iteration achieves the result of the best approximation. If "yes", turn to the end of the iteration process step, otherwise jump to $S_2$ to continue the iteration process.

$S_7$ is the end.

Through such iteration process, the position of the Lane can be obtained to play the role of the lane detection.

Figure 3:
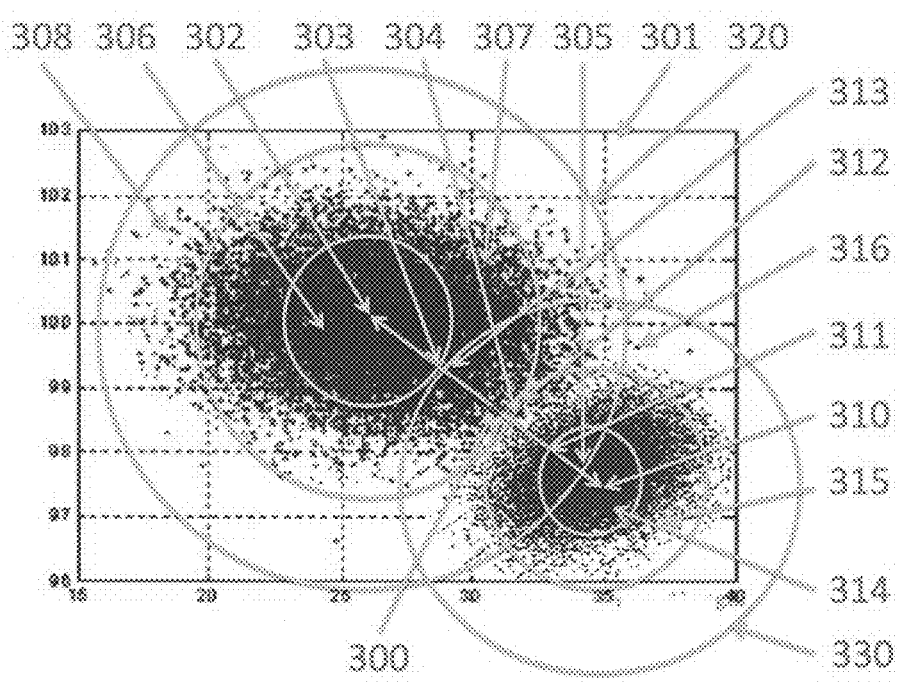
FIG. 3 shows definition diagram of distance traversing different spaces including probability spaces.

FIG. 3 shows definition diagram of distance traversing different spaces including probability spaces.

As shown in FIG. 3: (301) is a Euclidean space covering probability space. There are two probability spaces (320) and (330) in Euclidean space. (302) is the central point of the probability distribution (320). (303) is the scale of the first probability distribution value of the probability distribution (320), (304) is the second probability distribution value of the probability distribution (320), and (305) is the third probability distribution value of the probability distribution (320). In addition, (306) is the domain of the scale of the first probability distribution of the probability distribution (320). The scale spacing between (302) and (303) is $D_{1j}^{(320)}$ and within this domain, the probability distribution value is $p_{1j}^{(320)}$, (307) is the domain of the scale of the second probability distribution of the probability distribution (320), and the scale spacing between 303 and 304 is $D_{2j}^{(320)}$ and within this domain, the probability distribution value is $p_{2j}^{(320)}$. (308) is the domain of the scale of the third probability distribution of the probability distribution (320). The scale spacing between 304 and 305 is $D_{3j}^{(320)}$ and within this domain, the probability distribution value is $p_{3j}^{(320)}$.

Similarly, (310) is the central point of the probability distribution (330). (311) is the scale of the first probability distribution value of the probability distribution (330), (312) is the scale of the second probability distribution value of the probability distribution (330), and (313) is the scale of the third probability distribution value of the probability distribution (330). In addition, (314) is the domain of the scale of the first probability distribution of the probability distribution (330) and the scale spacing between 310 and 311 is $D_{1j}^{(330)}$, and within this domain, the probability distribution value is $p_{1j}^{(330)}$. (315) is the domain of the scale of the second probability distribution of probability distribution (330) and the scale spacing between 311 and 312 is $D_{2j}^{(330)}$ and within this domain, the probability distribution value is $p_{2j}^{(330)}$. (316) is the domain of the scale of the third probability distribution of the probability distribution (330), and the scale spacing between 312 and 313 is $D_{3j}^{(330)}$ and within this domain, the probability distribution value is $p_{3j}^{(330)}$.

Furthermore, the probability distribution centers for probability spaces (320) and (330) are set to be the elements $w_j \in W$ and $v_j \in V$ of the two data sets of (302) and (310). Then a straight line is connected between the probability distribution center (302) and (310), and there is any point $r_j \in R$ in the middle of the line, then determine whether any point $r_j \in R$ belongs to probability space (320) or probability space (330).

Then $m_j^{(wj)}$ is set to be the number of probability distribution scales between net and the probability distribution center $w_j \in W$, and $m_j^{(vj)}$ is the number of probability distribution scales between net and the probability distribution center $v_j \in V$. For example, in FIG. 3, $m_i^{(wj)}=3$, $p_{ij}^{(wj)}=p_{ij}^{(520)}$, $p_{ij}^{(vj)}=p_{ij}^{(530)}$ [i=1, 2, . . . , $(m_j^{(wj)}=m_j^{(wj)})$.].

Then, between the set V of probability space (330) and the set W of probability space (320), the distance G (V, W) between Euclidean space and probability space can be unified and calculated with the following formula:

$$(V, W) = \left\{ \sqrt[2]{\sum_{j=1}^{n}(r_j - v_j)^2} \right\} + \left\{ \sqrt[2]{\sum_{j=1}^{n}(r_j - w_j)^2} \right\} = \quad \text{[Formula 9]}$$

$$\left\{ \sqrt[2]{\sum_{j=1}^{n}(r_j - w_j)^2} \right\} = \left\{ \sqrt[2]{\sum_{j=1}^{n}(w_j - v_j)^2} \right\}$$

$$(r_j - v_j) = \begin{cases} 0 & |r_j - v_j| \leq \Delta_j^{(vj)} \\ |r_j - v_j| - \Delta_j^{(vj)} & |r_j - v_j| > \Delta_j^{(vj)} \end{cases}$$

$$(r_j - w_j) = \begin{cases} 0 & |r_j - w_j| \leq \Delta_j^{(wj)} \\ |r_j - w_j| - \Delta_j^{(wj)} & |r_j - w_j| > \Delta_j^{(wj)} \end{cases}$$

$$(v_j - w_j) = (w_j - v_j) =$$

$$\begin{cases} 0 & |v_j - w_j| \leq \left(\Delta_j^{(vj)} + \Delta_j^{(wj)}\right) \\ |v_j - w_j| - \left(\Delta_j^{(vj)} + \Delta_j^{(wj)}\right) & |v_j - w_j| > \left(\Delta_j^{(vj)} + \Delta_j^{(wj)}\right) \end{cases}$$

Wherein $$\Delta_j^{(vj)} = \sum_{i=1}^{m_j^{(vj)}} D_{ij}^{(vj)} P_{ij}^{(vj)}$$

In addition $$\Delta_j^{(w,j)} = \sum_{i=1}^{m_j^{(w,j)}} D_{ij}^{(w,j)} P_{ij}^{(w,j)}$$

The above formula is based on: as the distance between the set V of probability space and the set W of probability space, a point set R between the set V and the set W can be introduced, the distance between the set R and set V of the probability space is added to the distance between the set R and set W of the probability space, whether the probability space 330 and the probability space 320 is the probability that occurs simultaneously, the distance between the set V of probability space and the set W of probability space is set up, and satisfy the symmetry of the distance scale and the triangle inequality.

In the above formula, $(\Delta_j^{(v,j)} + \Delta_j^{(w,j)})$ is in the probability space 320 and 330, because the distance of the probability space in the region where the probability distribution is "1" should be "0", so it is the error value between Euclidean distance and the distance of the probability space, the strict distance of probability space 320 and 330 that can unify Euclidean space and probability space can be obtained with removal of the two error values.

A method of obtaining the distance between Euclidean space and probabilistic space is presented in FIG. 3, which is characterized by the existence of at least one probability space in Euclidean space, and when traversing a region of probability space, the probability distance of this interval is related to the probability value of the region through which it passes.

The above-mentioned Euclidean spaces can be extended: including one of Manhattan Space; Chebyshev Space; Minkowski Space; Mahalanobis Space; and the Cosine Space.

The above-mentioned Formula (9) can unify the distance between Euclidean space and probability space, and satisfy the following distance conditions:

(1) Non-negativity: $\forall w, v, d(w, v) \geq 0$;
(2) Non-degeneracy: $d(w, v) = 0$, then $w = v$;
(3) Symmetry: $\forall w, v, d(w, v) = d(v, w)$;
(4) Triangular inequality: $\forall w, r, v\ d(w, v) \leq d(w, r) + d(r, v)$.

On the basis that the Formula 9 can unify the distance between Euclidean space and probability space, and has all the conditions of distance scale, a more rigorous scale formula of fuzzy event probability measurement can be introduced as follows.

As mentioned above, when considering the fuzzy event probability measurement between $r_j \in R$ and the central value $v_j \in V$ of probability distribution value of probability space (330), if $r_j \in R$ happens to be in some region of probability distribution of probability space (330), the probability distribution value of this region can be set to be equal to $pf_j^{(v,j)}$, and in addition, the central value of the probability distribution value $w_j \in W$ of accidental probability space (320) is just in some region of the probability distribution of the probability space (330), the probability distribution value can be set to be equal to $pf_j^{(w,j)}$ which is equivalent to almost coincidence of the two probability distributions.

According to formula 9, the formula of fuzzy event probability measurement that set R belongs to set V can be derived from the following formula:

$$F^{(v)} = \left\{ \sum_{j=1}^{n} \left[1 - \frac{(r_j - v_j)^2}{(w_j - v_j)^2}\right] \right\} \times 100 = \left\{ \sum_{j=1}^{n} \left[1 - \frac{(v_j - r_j)^2}{(v_j - w_j)^2}\right] \right\} \times 100 \quad \text{[Formula 10]}$$

$$(r_j - v_j) = (v_j - r_j) = \begin{cases} 0 & |r_j - v_j| \leq \beta_j^{(v,j)} \Delta_j^{(v,j)} \\ |r_j - v_j| - \beta_j^{(v,j)} \Delta_j^{(v,j)} & |r_j - v_j| > \beta_j^{(v,j)} \Delta_j^{(v,j)} \end{cases}$$

$$(w_j - v_j) = (v_j - w_j) =$$
$$\begin{cases} 0 & |w_j - v_j| \leq \alpha_j(\Delta_j^{(w,j)} + \Delta_j^{(v,j)}) \\ |w_j - v_j| - \alpha_j(\Delta_j^{(w,j)} + \Delta_j^{(v,j)}) & |w_j - v_j| > \alpha_j(\Delta_j^{(w,j)} + \Delta_j^{(v,j)}) \end{cases}$$

Wherein, $$\Delta_j^{(w,j)} = \sum_{i=1}^{m_j^{(w,j)}} D_{ij}^{(w,j)} P_{ij}^{(w,j)}$$

$$\Delta_j^{(v,j)} = \sum_{i=1}^{m_j^{(v,j)}} D_{ij}^{(v,j)} P_{ij}^{(v,j)}$$

In addition, $\beta_j^{(v,j)} = (1 + Pf_j^{(v,j)})$ $\alpha_j = (1 + Ph_j^{(v,j)} + Ph_j^{(w,j)})$ According to the above-mentioned Formula 9 and Formula 10, $D_{ij}^{(w,j)} D_{ij}^{(v,j)}$ and $D_{ij}^{(v,j)}$, $p_{ij}^{(w,j)}$ and $p_{ij}^{(v,j)}$, $m_j^{(w,j)}$ and $m_j^{(v,j)}$, $pf_j^{(v,j)}$ and $pf_j^{(w,j)}$, $ph_j^{(v,j)}$ and $pH_j^{(w,j)}$ can be calculated, The formula of fuzzy event probability measurement that set R belongs to set W can be calculated according to the following formula:

$$F^{(w)} = \left\{ \sum_{j=1}^{n} \left[1 - \frac{(r_j - w_j)^2}{(v_j - w_j)^2}\right] \right\} \times 100 = \left\{ \sum_{j=1}^{n} \left[1 - \frac{(w_j - r_j)^2}{(w_j - v_j)^2}\right] \right\} \times 100 \quad \text{[Formula 11]}$$

-continued $$(r_j - w_j) = (w_j - r_j) = \begin{cases} 0 & |r_j - w_j| \le \beta_j^{(w,j)} \Delta_j^{(w,j)} \\ |r_j - w_j| - \beta_j^{(w,j)} \Delta_j^{(w,j)} & |r_j - w_j| > \beta_j^{(w,j)} \Delta_j^{(w,j)} \end{cases}$$

$$(v_j - w_j) = (w_j - v_j) =$$
$$\begin{cases} 0 & |v_j - w_j| \le \alpha_j (\Delta_j^{(v,j)} + \Delta_j^{(w,j)}) \\ |v_j - w_j| - \alpha_j (\Delta_j^{(v,j)} + \Delta_j^{(w,j)}) & |v_j - w_j| > \alpha_j (\Delta_j^{(v,j)} + \Delta_j^{(w,j)}) \end{cases}$$

Wherein, $$\Delta_j^{(w,j)} = \sum_{i=1}^{m_j^{(w,j)}} D_{ij}^{(w,j)} P_{ij}^{(w,j)}$$

$$\Delta_j^{(v,j)} = \sum_{i=1}^{m_j^{(v,j)}} D_{ij}^{(v,j)} P_{ij}^{(v,j)}$$

In addition, $$\beta_j^{(w,j)} = (1 + Pf_j^{(w,j)})$$

$$\alpha_j = (1 + Ph_j^{(v,j)} + Ph_j^{(w,j)})$$

Finally, according to Formula 10 and Formula 11, the results of super-depth antagonistic learning can be obtained through the following formulas:

$$F = (F^{(W)} / F^{(V)}) \quad \text{[Formula 12]}$$

According to Formula 12, arbitrary set R is in the two probability distributions and the best classification can be obtained. The same as Formula 9, Formula 10 and Formula 11 also satisfy all the conditions of the distance scale.

The antagonistic learning of the above formula 12 can also start to confront from the microcosmic as shown in formula 13.

$$F = \left\{ \sum_{j=1}^{n} \left[ 1 - \frac{(r_j - w_j)^2}{(r_j - v_j)^2} \right] \right\} \times 100 = \left\{ \sum_{j=1}^{n} \left[ 1 - \frac{(w_j - r_j)^2}{(v_j - r_j)^2} \right] \right\} \times 100$$

$$(r_j - w_j) = (w_j - r_j) = \begin{cases} 0 & |r_j - w_j| \le \beta_j^{(w,j)} \Delta_j^{(w,j)} \\ |r_j - w_j| - \beta_j^{(w,j)} \Delta_j^{(w,j)} & |r_j - w_j| > \beta_j^{(w,j)} \Delta_j^{(w,j)} \end{cases}$$

$$(r_j - v_j) = (v_j - r_j) = \begin{cases} 0 & |r_j - v_j| \le \beta_j^{(v,j)} \Delta_j^{(v,j)} \\ |r_j - v_j| - \beta_j^{(v,j)} \Delta_j^{(v,j)} & |r_j - v_j| > \beta_j^{(v,j)} \Delta_j^{(v,j)} \end{cases}$$

$$\Delta_j^{(w,j)} = \sum_{i=1}^{m_j^{(w,j)}} D_{ij}^{(w,j)} P_{ij}^{(w,j)}$$

$$\Delta_j^{(v,j)} = \sum_{i=1}^{m_j^{(v,j)}} D_{ij}^{(v,j)} P_{ij}^{(v,j)}$$

In addition, $$\beta_j^{(w,j)} = (1 + Pf_j^{(w,j)})$$

$$\beta_j^{(v,j)} = (1 + Pf_j^{(v,j)})$$

Formula 13 is a formulaic antagonistic learning model, which can integrate the micro-uncertain spatial information and the random probability information through antagonism, and produce deterministic, stable and valuable information microscopically, which is the superiority of the antagonistic learning based on fuzzy event probability measurement.

The above-mentioned formula of membership function of the fuzzy event probability measurement is just an example, which is an arbitrary formula composition that can form the objective function to the fuzzy value of 0-1 according to a given rule, or considering formula composition of fuzzy information and probability information, or considering the formula composition of spatial information and probability information to be within the scope of the invention.

Figure 4:
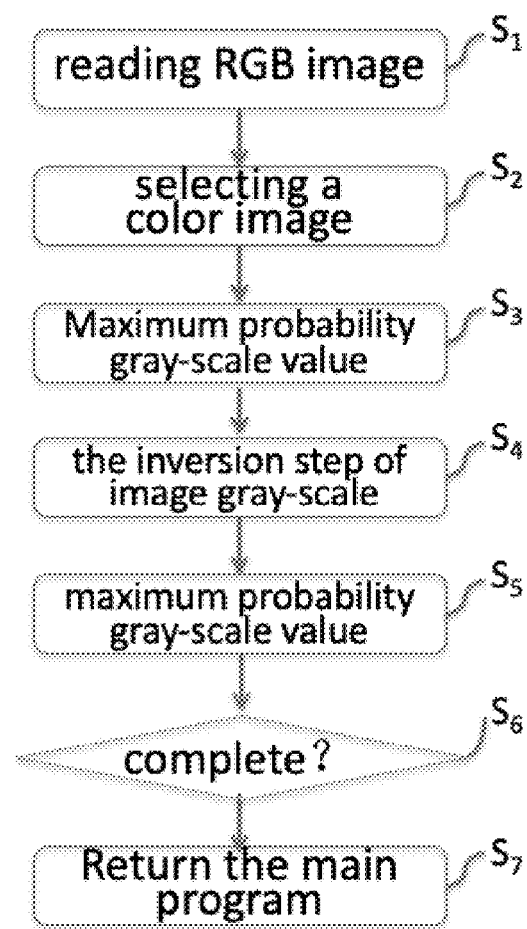
FIG. 4 is flow diagram of the extraction of the overall characteristics of the lane environment.

FIG. 4 is flow diagram of the extraction of the overall characteristics of the lane environment.

As shown in FIG. 4: Through the learning program of overall characteristics of the lane environment, the overall RGB image of the lane environment can be read or the RGB image can be converted into Lab image, and then the overall characteristics of the lane environment can be obtained by the following 7 steps. The whole image of the lane environment mainly shows the characteristics of environment, such as day, night, cloudy day, sunny day, when the road lighting is good, when the road lighting is bad and so on.

$S_1$ is the step of reading RGB image: In this step, the entire RGB image of the lane environment read, or the RGB image is converted to Lab image, in order to prevent the image brightness from affecting the recognition accuracy, the brightness is removed, only four colors of +a, −a, +b, −b are used.

[Formula 13]

$S_2$ is the step of selecting a color image: select one of three colors of R color, G color and B color, or one of four colors of +a color, −a color, +b color, −b color of Lab color to process.

$S_3$ is the calculation step of maximum probability gray-scale value: In this step, the subroutine of "maximum probability gray-scale value calculation" is called to determine the maximum gray-scale value of maximum probability of given color image.

$S_4$ is the inversion step of image gray-scale: considering to extract two eigenvalues for the overall image of one color lane environment, eigenvalue of maximum gray-scale value and eigenvalue of minimum gray-scale value, 6 eigenvalues can be extracted from R color, G color and B color, or 8 eigenvalues can be extracted from four colors of +a color, −a color, +b color and −b color.

$S_5$ is the calculation step of maximum probability gray-scale value: the same as the third step $S_3$, in which the subroutine of "maximum probability gray-scale value calculation" is called to determine the minimum gray-scale value of the maximum probability of given color image.

$S_6$ is the judgment step to complete the extraction of characteristics: whether the two image characteristics of the maximum gray-scale value of the maximum probability and the minimum gray-scale value of the maximum probability of one image of the three colors R, G, B, or one image of the four colors +a color, −a color, +b color of Lab color are completely extracted? If the image is not fully extracted and another color is selected for processing, then jump to the second step $S_{3,\,2}$, and go to the next step if it is fully extracted.

$S_7$ is the return step: Return to the main program. The calculation of the maximum probability gray-scale value is carried out by the following methods.

Figure 5:
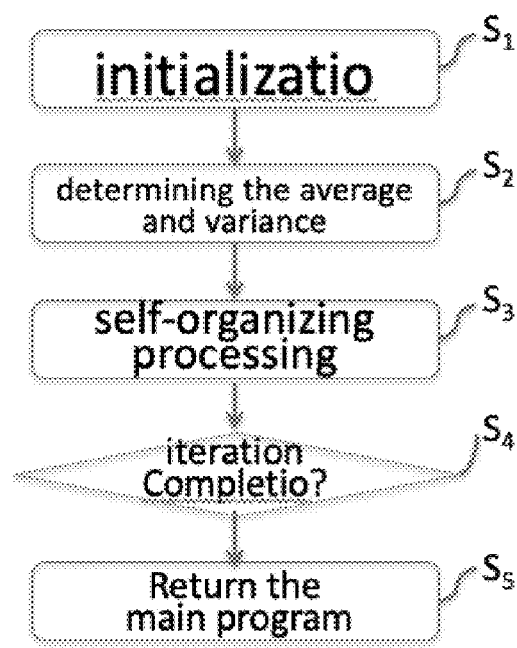
FIG. 5 is a calculation flow diagram for obtaining the maximum probability gray-scale value.

FIG. 5 is a calculation flow diagram for obtaining the maximum probability gray-scale value.

As shown in FIG. 5: the calculation of maximum probability gray-scale value of given color image is accomplished through the following 5 steps.

$S_1$ is the initialization step: In this step, the maximum number of iterations equal to MN is set, generally 5-10 times is selected, then the iteration progress constant equal to v is set mainly to determine whether the iteration is still effective.

$S_2$ is the step for determining the average and variance of the gray-scale value:

A image is set to equal to n×m pixel $a_{ij}$, (i=1,2, . . . , n, j=1, 2, . . . m), and the average gray-scale value of the $k^{th}$ iteration of an image is set to equal to $g^{(k)}$;

$$g^{(k)} = \frac{1}{n \times m} \sum_i^n \sum_j^m a_{ij} \qquad \text{[Formula 14]}$$

The disperse of probability distribution of the gray-scale value of an image is as:

$$S^{(k)} = 2\sqrt{\frac{1}{n*m-1} \sum_i^n \sum_j^m (a_{ij} - g^{(k)})^2} \qquad \text{[Formula 15]}$$

$S_3$ is the self-organizing processing step: taking $g^{(k)}$ as the center, taking $S^{2(k)}$ as the two boundary, that is maximum probability scale, preserving the pixel that conforms to the boundary and removing the pixel outside the boundary, then constituting a new set of pixels, that is the new maximum probability space.

$S_4$ is the judgment step of iteration completion: the iteration number return subtracts the maximum number, that is (MN−k)=0?, or $|S_{2(k+1)}S^{2(k)}| \le v$? If "yes", then the iteration is completed, jump to the fifth step $S_5$, and if "no", then jump to the second step $S_2$ to continue the iteration processing.

$S_5$ is the iteration return step: Return the main program.

In order to extract the lane image, a local characteristics extraction method is required, which is to extract the eigenvalue of gray-scale image of the lane image according to the marking range of the given lane and the eigenvalue of the gray-scale difference between the lane and the lane background.

Following the above-mentioned characteristics extraction method of overall characteristics of lane environment, firstly, the machine learning method of the maximum probability gray-scale value of FIG. 5 is used to determine maximum probability gray-scale value of the R color, G color, B color image, or +a color, −a color, +b color, −b color image in the set of Lane pixels respectively, and determine the maximum probability gray-scale value of R, G and B color image of the non-lane to obtain 6 maximum probability gray-scale value, or obtain 8 maximum probability gray-scale values from +a color, −a color, +b color image respectively, the maximum probability gray-scale values of RGB three colors subtract the maximum probability gray-scale values of RGB three corresponding colors of non-lane respectively, or the maximum probability gray-scale values of +a color, −a color, +b color, −b color of lane subtract the maximum probability gray-scale value of the four corresponding colors of the non-lane, wherein the absolute value for the result is selected, then the three eigenvalues of three lane differences are obtained, and the three eigenvalues of the maximum probability gray-scale values of RGB three colors of lane itself, together with the overall characteristics of 6 lane environments, there are totally 12 eigenvectors which can reflect the eigenvector composed of eigenvalue of lane images, or four eigenvalues of lane difference of four colors of +a color, −a color, +b color, −b color, two lanes are eigenvalue of eight lane differences, and the four eigenvalues of the maximum probability gray-scale value of four colors +a color, −a color, +b color of the lane itself, the two lanes are eigenvalue of eight lane differences, plus the overall characteristics of the six lane environments, there are totally 22 eigenvectors which can reflect the eigenvector composed of eigenvalue of the lane images.

The concrete image extraction of lane is carried out through two steps, a lane marks learning step, in which the machine learns from human being of "What is the lane image"? An eigenvector query data which can express the characteristics of lane image saved in the database is generated by machine learning. The data tagging technology used here is to do the machine learning with the tagged data and obtain the probability distribution of the tagged data, so the large data tagging effect required for traditional deep learning can be realized only by using data tagging of small data.

Another step to extract the lane image is to use the lane environment image which is read online. Through the above-mentioned method, 22 sample eigenvalues are obtained, and 22 sample eigenvalues and the feature query data stored in the database are used to do the calculation that can unify the distance between Euclidean space and probability space, wherein the gray-scale value of lane in the nearest eigenvector can be found out as the gray-scale value of the lane of the sample image, the gray-scale value of RGB three images is extracted, or the gray-scale value of +a color, −a color, +b color of four images is extracted, then a lane image can be obtained.

Figure 6:
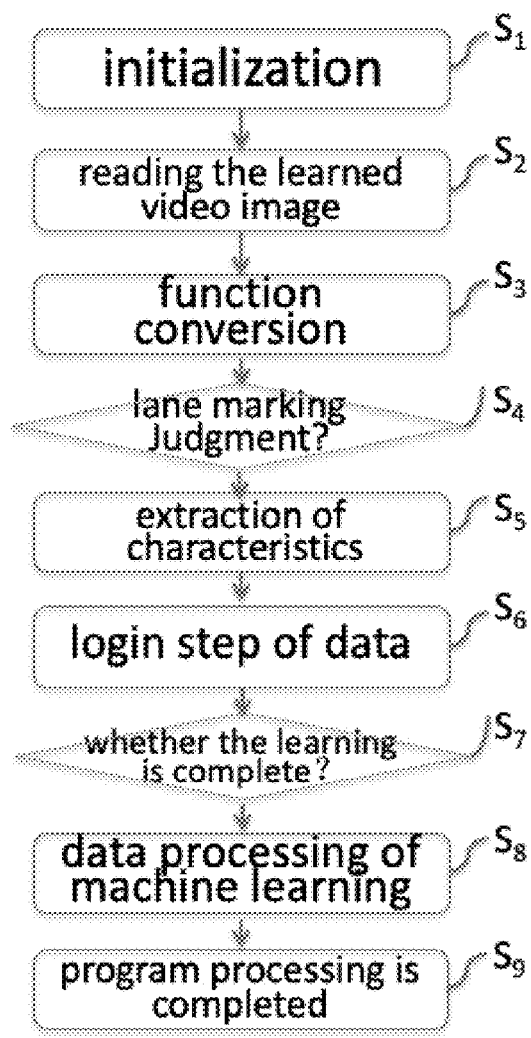
FIG. 6 a is a flow diagram of machine learning for the image characteristics of a lane.

FIG. 6a is a flow diagram of machine learning for the image characteristics of a lane. As shown in FIG. 6, the overall image feature learning in the lane environment is performed as the following 9 steps.

$S_1$ is the initialization step: the times of learning is set, one time of learning for the overall image of a lane environment is carried out. The times of learning is set to be equal to g.

$S_2$ is the step of reading the learned video image: the video image that needs to be learned is read.

$S_3$ is the function conversion step: the machine learning function of the image feature of lane environment and in time switch processing of lane detection function is carried out, which make lane tagging work directly by hand in the automatic drive.

$S_4$ is the lane marking judgment step: to determine if the video image has been tagged, if "yes", turn to the next step $S_5$, if "no", return to $S_2$ step to continue to read the video image.

$S_5$ is step of extraction of characteristics of lane image: In this step, firstly, the above subroutine of "extraction of characteristics of environment integral image" is called, at the same time, according to the tagged location, the above lane local extraction of characteristics is carried out, and then an eigenvector composed of 12 eigenvalues is obtained.

$S_6$ is the login step of machine learning data: the extraction value of the overall characteristics of environment integral image obtained from the above subroutine of "extraction of characteristics of environment integral image" is logged in, and the eigenvectors composed of the total 12 eigenvalues of lane local eigenvalue is logged in database.

$S_7$ is to judges whether the learning is complete: judge whether the machine learning of g times has been completed, if "yes", turn to the next step, if "no"; turn to the second step $S_2$.

$S_8$ is the data processing steps of machine learning: In this step, the g times of learning by the same lane image, through machine learning, gets a maximum probability eigenvector of 12 maximum probability value from the g eigenvectors that are composed of 12 eigenvalues respectively, and 12 maximum probability scale, then, according to the statistical probability distribution characteristics, the maximum probability value and the maximum probability scale constitute the maximum probability distribution information of the lane image.

Figure 7:
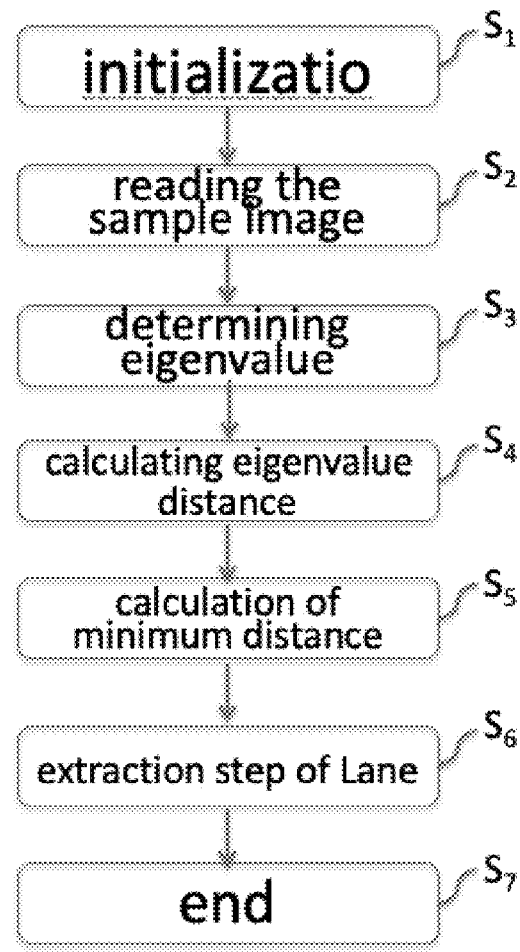
FIG. 7 is a flow diagram of image extraction of a lane.

$S_9$ is the end: program processing is completed. FIG. 7 is a flow diagram of image extraction of a lane. As shown in FIG. 7: the lane image extraction can be determined according to the following steps:

$S_1$ is the initialization step: Probability scale, 2× variance of the minimum distance, which is the value in the record corresponding to the minimum distance.

$S_2$ is the step of reading the sample image: an image in the lane environment image video is read.

$S_3$ is the step of determining eigenvalue: determine the 6 eigenvalues of background images from RGB three colors images of sample image respectively, and the lane difference features include 12 left-right lane features, total 18 features. Attention should be paid to the eigenvalue data corresponding to three RGB color after learning or for the Lab color image of sample image, determining 8 eigenvalues of the background image respectively, and lane difference characteristics include 16 lane characteristics including left and right lane, a total of 24 characteristics. The image data to be extracted is separated from the original image data by human intervention, and includes color information, gradation value information, edge information, frequency information, pattern information, and spatial relation information of the image to be extracted. Obtaining a complex feature value based on at least one image information.

$S_4$ steps for calculating sample eigenvalue distance:

The image of lane environment in different state is set to be equal to $F^z$ (z=1, 2, . . . ,g). Each image $F^z$ can produce h characteristics, and the maximum probability eigenvalue data: $L_{ij} \in L_j$ (i=1, 2, . . . , h, j=1, 2, . . . , g), and the maximum probability scale data $M_{ij} \in M_j$ (i=1, 2, . . . , h, j=1, 2, . . . , g) can be learned by h×g machines, that is:

$$\begin{pmatrix} L_{11}, L_{11}, \ldots, L_{1h} \\ L_{21}, L_{21}, \ldots, L_{2h} \\ \ldots \\ L_{g1}, L_{g1}, \ldots, L_{gh} \end{pmatrix}$$ [Formula 16]

and $$\begin{pmatrix} M_{11}, M_{12}, \ldots, M_{1h} \\ M_{21}, M_{21}, \ldots, M_{2h} \\ \ldots \\ M_{g1}, M_{g1}, \ldots, M_{gh} \end{pmatrix}$$ [Formula 17]

The characteristics data $S_j \in S$ (j=1, 2, . . . , h) of known sample is:

$$(S_1, S_2, \ldots, S_h)$$

The distance between sample characteristics data $S_j \in S$ (j=1, 2, . . . , h) and the data $L_i$ of machine learning data after the $i^{th}$ login is:

$$G^{(i)}(S,L) = \sqrt{\sum_{j=1}^{h}(S_j - \mathcal{L}_j)^2}$$ [Formula 18]

Wherein $$(S_j - \mathcal{L}_j) = \begin{cases} 0 & |S_j - \mathcal{L}_j| \leq M_j \\ |S_j - \mathcal{L}_j| - M_j & |S_j - \mathcal{L}_j| > M_j \end{cases}$$

In the above formula, $M_{ij}$ is the maximum probability scale of the $j^{th}$ eigenvalue of the $i^{th}$ eigenvector, and the probability distance of the maximum probability space constituted between the maximum probability value $L_{ij}$ and the maximum probability space $M_{ij}$ is "0", which can be regarded as the distance error difference between Euclidean space and probability space, through subtracting this error difference, a simplified formula 17 that unify Euclidean space and the probability space-plus distance can be obtained.

$S_5$ is the calculation steps of minimum distance: For the g maximum probability eigenvector of formula 16 and g maximum probability scale eigenvector of formula 17, the h distance can be obtained from the sample eigenvector of formula 18 calculated:

Determine the minimum distance min $G^{(i)}$.

$G^{(1)}, G^{(2)}, \ldots, G^{(h)}$ $S_6$ is the extraction step of lane: The maximum probability gray-scale value of RGB three colors of the lane image that the $i^{th}$ eigenvector corresponds as mentioned above, or the maximum probability gray-scale value of four colors of Lab color, can extract the lane as the gray-scale value of the lane image.

$S_7$ is the end: program processing is over. FIGS. 8(a)-8(b) are effect figures of lane line approximation by automatic machine learning.

As shown, FIG. 8(a) shows an iteration process of automatic machine learning approaching to the lane, it can be clearly seed that the lane is approached further than the previous iteration. FIG. 8(b) shows the recognition result of lane and the best approximation lane is clearly seen.

FIGS. 9(a)-9(b) are effect figures of image extraction of lane lines importing into the SDL Model.

As shown in FIGS. 9(a)-9(b): Compared with the traditional binarization image, in the effect of the image extraction of lane importing into SDL model, the lane is extracted very clearly and there is no interference image around it, so the precision of lane detection is higher than that of traditional method.

In order to prevent the extraction of lane image from reducing the learning times of lane image, the relationship of each color of lane and background image can be built, such as the ratio of the gray scale of a certain color of lane and the maximum gray scale of background image, or the ratio of the gray scale of a certain color of Lane and the minimum gray scale of background image.

Alternatively, the gray scale of the lane color can be found out by means of antagonistic learning, the maximum probability value that is not the approached of the lane but less than the gray-scale value of the lane, and the maximum probability value that is not the approached of the lane but more than the gray-scale value of the lane. The antagonistic learning of the lane between these two values is allowed to carry out to find the probability distribution of the difference between the lane and these two values, and the lane and the adjacent image (for example, the lane is on the road, the two side images are road images, with the characteristics of the general low gray-scale value). Then the extracted eigenvector of the lane is obtained as the basis of the lane extraction.

The above-mentioned image extraction method for importing SDL model comprises the part of eigenvector generation and the part of image extraction.

The part of eigenvector generation part: the gray-scale value of each color of the image required to be extracted is the main plural eigenvalue; or the plural eigenvalues of the difference between the gray-scale value of each color of required image and the color gray-scale value of other image is set up. The above eigenvector corresponds to the gray-scale value of each color of the required image. For different images, a plurality of training times for each eigenvalue of the eigenvector is carried out to obtain the maximum probability value, space and scale of each eigenvalue in the eigenvectors; Then the results are logged-in into the database.

The part of image extraction: For the sample image data, the eigenvector is determined according to the above methods. The distance between the eigenvector of the sample image and each eigenvector registered in the database and the distance that can unify the Euclidean space and the probability space is calculated, and the gray-scale value of each color of the required image in the eigenvector learned with the smallest distance is found out. The part of image extraction: for the sample image data, the eigenvector is determined according to the above methods.

The above-mentioned maximum probability space, as shown in FIG. 5, is the space enclosed by the maximum probability scale $S^{2(k)}$ obtained from the iteration result of self-organizing machine learning of probability scale, which takes the maximum probability $g^{(k)}$ as center and the space enclosed by the maximum probability scale $S^{2(k)}$. The described maximum probability distribution can be referred to the formula 18, which is composed of the maximum probability value $g^{(k)}$ obtained from the iteration result of self-organizing machine learning of probability scale and the maximum probability scale $S^{2(k)}$.

The edge image processing method is also proposed in the present invention. In automatic drive cars, the binocular camera is required in the optical recognition environment image, in order to quickly read the video data of binocular camera, generally a FPGA chip is used to achieve it, however, FPGA can only start from the binary image processing, and in order to recognize the vehicle environment image with high precision and high speed, it is necessary to transform the binarization image of the video image read by a binocular camera into edge image, here is proposed a transform method for an edge image with high precision.

Firstly, the calculation of image by the first derivative method is carried out. The function expression of the two-dimensional image is set to be equal to F (x, y). The method to determine the first derivative for the image is as follows:

$$\frac{\partial \mathcal{F}(x, y)}{\partial x} = \frac{1}{2}[\mathcal{F}(x+1, y) - \mathcal{F}(x-1, y)] \quad \text{[Formula 19]}$$

$$\frac{\partial \mathcal{F}(x, y)}{\partial y} = \frac{1}{2}[\mathcal{F}(x, y+1) - \mathcal{F}(x, y-1)]$$

derivative for the image is as follows:

$$\frac{\partial^2 \mathcal{F}(x, y)}{\partial x} = \frac{1}{2}\left[\frac{\partial \mathcal{F}(x-1, y)}{\partial x} - \frac{\partial \mathcal{F}(x+1, y)}{\partial x}\right] \quad \text{[Formula 20]}$$

$$\frac{\partial^2 \mathcal{F}(x, y)}{\partial x} = \frac{1}{2}\mathcal{F}(x, y) - \frac{1}{4}\mathcal{F}(x-2, y) - \frac{1}{4}\mathcal{F}(x+2, y)$$

$$\frac{\partial^2 \mathcal{F}(x, y)}{\partial y} = \frac{1}{2}\left[\frac{\partial \mathcal{F}(x, y-1)}{\partial y} - \frac{\partial \mathcal{F}(x, y+1)}{\partial y}\right] \quad \text{[Formula 21]}$$

$$\frac{\partial^2 \mathcal{F}(x, y)}{\partial y} = \frac{1}{2}\mathcal{F}(x, y) - \frac{1}{4}\mathcal{F}(x, y-2) - \frac{1}{4}\mathcal{F}(x, y+2)$$

The machine learning import method for determining derivation of image is as follows. Determining derivation of an image can cause strong noise. In order to suppress noise, the Prewitt algorithm and Sobel algorithm are traditionally used. Here, a probability scale self-organizing machine learning algorithm is introduced, which can determine the derivative value of the maximum probability of a pixel in the middle from the derivative of the plural of pixels.

FIG. 10 is a method diagram for solving the derivative value of the maximum probability.

As shown in FIG. 10, the pixel F (x, y) is taken as the center, the first derivative values of 25 pixels of 5*5 pixel are determined, and the maximum probability values within the 25 derivative values by the probability scale self-organizing machine learning are determined as shown in FIG. 5, and the maximum probability derivative value is made to be the formal derivation value of center point F (x, x). The derivative value of the entire image is calculated according to the horizontal and vertical translation of each point and then in this way, the calculation of the whole image is complete.

For the above-mentioned maximum probability value of the first derivative obtained by the maximum probability self-organizing model, "0" is set for the pixel less than "the maximum probability value of the first derivative value", and the pixel larger than "the maximum probability value of the first derivative value" is conserved and set at "256. Then, the result of the edge image can be obtained, or "256" is set for the pixel of the maximum probability space within the maximum probability scale of the first derivative value by using the maximum probability self-organizing model, and "0" is set for the other pixels.

Based on this result, the first derivative of 25 pixels with 5*5 following the above derivative method can be determined again in order to get the result of the second derivative. The second derivative can also be determined directly according to the formula (20) and (21) above. After calculating the second derivative of image pixels, each gray-scale value of the second derivative can be determined as the maximum probability value of the gray-scale value of the second derivative value by using the maximum probability self-organizing model shown in FIG. 5, that is, "0" gray scale is set for the pixel less than of the maximum probability value of the gray-scale value of the second derivative value, and "256" is set for the other pixel. Alternatively, the same as above, "256" is set for the pixel of the maximum probability space within the maximum probability scale of the second derivative value by using the maximum probability self-organizing model, and "0" is set for the other pixels. Then, the edge image of the second derivative can be obtained.

FIGS. 11(a)-11(b) are effect figures of the marginalization treatment of an image From FIGS. 11(a)-11(b), it can be seen that the effect of marginalized process by using probability scale self-organizing machine learning is significant. In order to formalize the "machine consciousness", the membership function is introduced here.

Figure 12A:
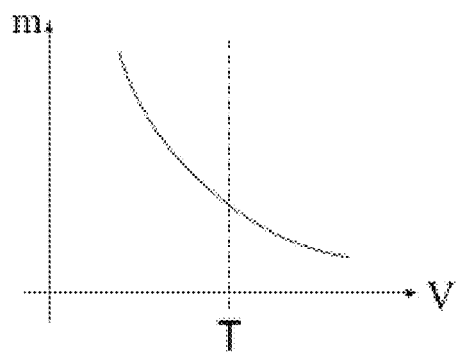
FIGS. 12(a)-12(d) show four characteristic curves of the formularized membership function of "machine consciousness"

FIGS. 12(a)-12(d) show four characteristic curves of the formularized membership function of "machine consciousness". As shown in FIG. 12(a), the smaller the independent variable value, the larger the MF value of membership function. On the contrary, the larger the independent variable value, the smaller the MF value of membership function. For example, the closer the speed of automatic drive car to the safe speed, the smaller the independent variable value, the greater the MF value, indicating that the safer the automatic drive car; on the contrary, the more dangerous the automatic drive car. By using such a formula, the state of the automatic drive car can be simply described. Here, T is the threshold value of a dangerous state.

Figure 12B:
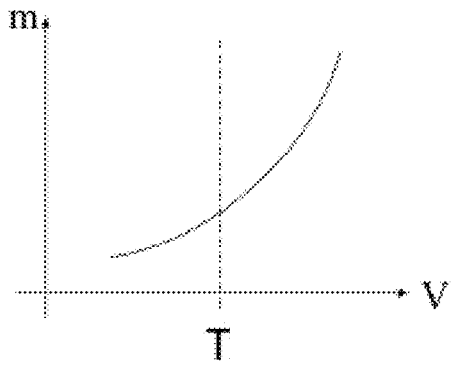

As shown in FIG. 12(b), the larger the independent variable value, the larger the MF value of membership function. The smaller the independent variable value, the smaller the MF value of membership function. For example, the greater the distance between an automatic driving car and a car on the same lane, the larger independent variable value becomes, and the larger the MF value, indicating that the automatic driving car is safer. In the contrary situation with a lower distance between the cars, the more dangerous the situation is for the automatic driving car. By using such a formula, the driving state of an automatic driving car based on the distance between the automatic driving car and the vehicle in the same lane can be simply described. Here, T is the threshold value of a dangerous state.

Figure 12C:
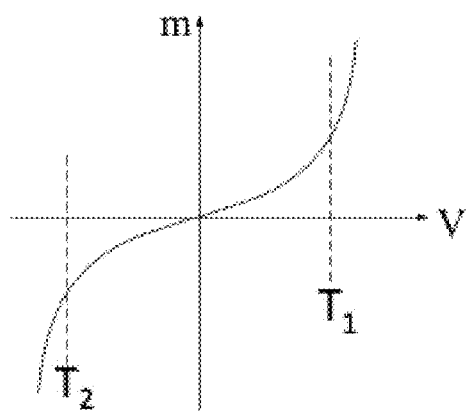

As shown in FIG. 12(c): it is a function of the automatic driving "machine consciousness" reflected from the front to the back by the distance of cars on the nearby lane. Initially, when there is a car traveling together on the lane in front of the automatic driving car, the farther the distance between the automatic drive car and the vehicle traveling together, the higher the MF value, the safer the automatic driving car will be. However, because the speed of automatic drive car is greater than the vehicle traveling together, the two cars are approaching gradually. When reaching the $T_1$ state, the automatic drive car goes into a dangerous state. The automatic drive car continues toward the vehicle traveling together. When reaching $T_2$ state, the automatic drive car is out of dangerous state. The farther the distance, the larger the MF value, the safer the automatic drive car. As shown in FIG. 12(c), it is a function of the automatic driving "machine consciousness" reflected from the front to the back by the distance of cars on the nearby lane.

Figure 12D:
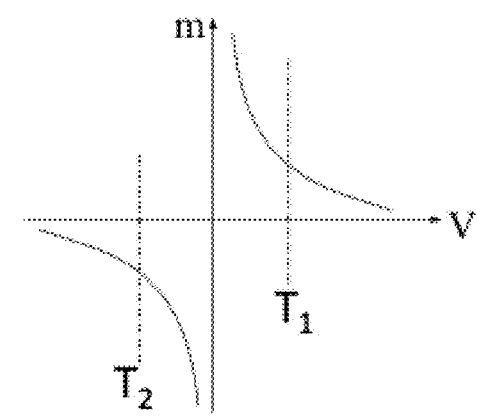

As shown in FIG. 12(d) given an optimal value, when the independent variable is from a higher value and gradually approaches this value, the MF value also approaches to the range of maximum value. When the independent variable value becomes smaller from the maximum value gradually, MF value becomes smaller gradually. For example, when the speed of the automatic drive car is higher than the safety value, and gradually approaches the safety value, the MF value becomes larger from small, and when the speed is less than the $T_1$ threshold value, the automatic drive car approaches the safety state. When the speed of the automatic drive car is lower than the range of the safe value, the lower the speed of the automatic drive car compared with the safe value, the more dangerous the situation becomes for the automatic drive car.

Figure 13:
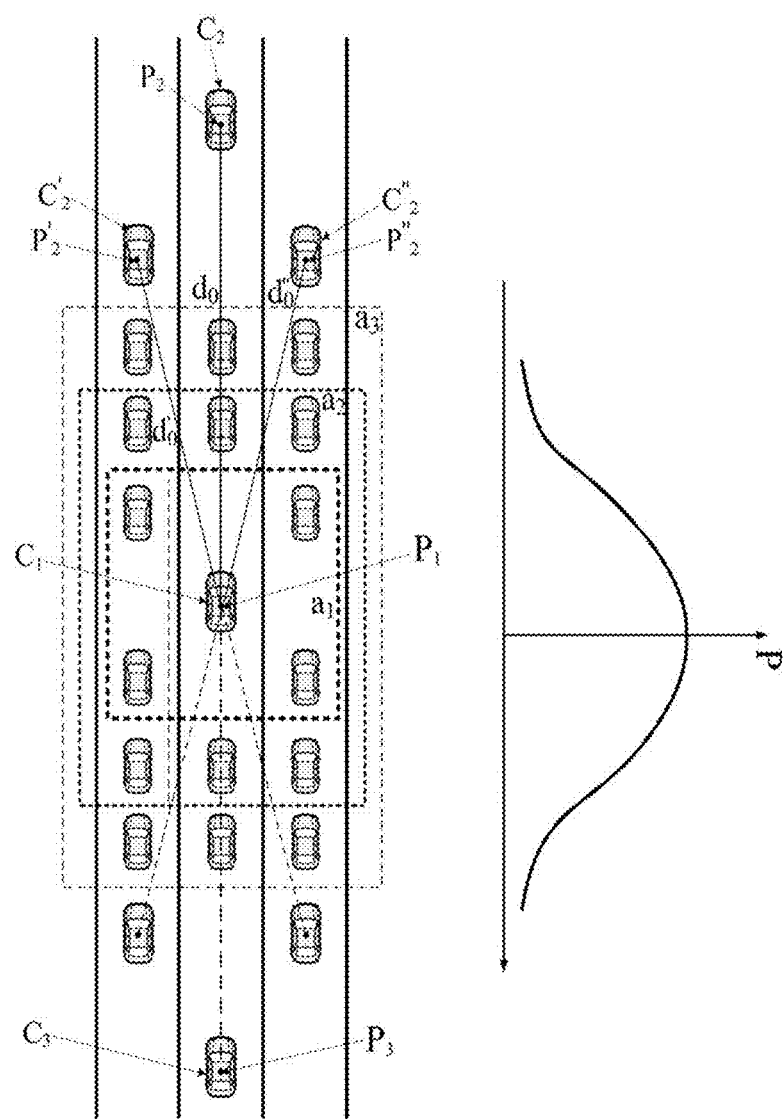
FIG. 13 shows a formalized model of the "machine consciousness" of automatic driving.

Because the changing process of a security state and a danger state is an exponential proportion change, the membership function is required to be a non-linear function. FIG. 13 shows a formalized model of the "machine consciousness" of automatic driving. As shown in FIG. 13, when the automatic drive car $C_1$ travels in a straight lane, it will encounter the vehicle $C_2$ traveling together in front. The distance between the location $p_1$ of the $C_1$ and the location $p_2$ of the vehicle $C_2$ traveling together is set to be equal to $d_0$, and the vehicle $C_2'$ traveling together is also encountered in front of the left lane. The distance between the location $p_1$ of the $C_1$ and the location $p_2'$ of the vehicle $C_2''$ traveling together is set to be equal to $d_0'$. In addition, the vehicle $C_2'$ traveling together is also encountered in front of the right lane, the distance between the location $p_1$ of the $C_1$ and the location $p_2'$ of the vehicle $C_2''$ traveling together is set to be equal to $d_0''$.

Again, the area of the $a_1$ is a dangerous area for the automatic drive car in which the $C_1$ is located, and is absolutely inadmissible. As every control unit of any self-regulating decentralized system, it is necessary to take self-disciplined measures to eliminate this dangerous condition at the expense of emergency braking.

Again, the area of $a_1$ is the second danger area for the automatic drive car $C_1$, where emergency brakes can be used to remove the dangerous area. The area of the $a_3$ is the third danger area for the automatic drive car $C_1$, in which the $C_1$ is located, in this area, the automatic drive car has to enter the area, in which it can't change lanes, but needs to avoid this area as soon as possible.

The speed of the automatic drive car $C_1$ is set to be equal to $S_1$, the speed of the vehicle $C_2$, $C_2'$ or $C_2''$ traveling together is set to be equal to $S_2$, $S_2'$ or $S_2''$, and the initial distance between the automatic drive car $C_1$ and $C_2$, $C_2'$ or $C_2''$ traveling together is $d_0$, $d_0'$, or $d_0''$. Then the dynamic distance between $C_1$ and $C_2$, $C_2'$ or $C_2$ traveling together is:

$$d=[d_0-(s_1-s_2)t] \qquad \text{[Formula 22]}$$

Then, the formula for the dynamic membership function of the distance between vehicles is as follows:

$$WD = \left| 1 - \left[ \frac{20}{d_0 - (s_1 - s_2)t} \right]^2 \right|$$ [Formula 23]

With this formula, all the machine consciousness of an automatic drive car during the travel in a straight line can be reflected by Formula 23, which is much simpler than the description of machine consciousness through the accumulation of rules.

Further, the probability of traffic accident is 0 when the vehicle traveling together is far away from $a_3$ area, but in $a_1$ area, if the vehicle traveling together is the front of the same lane, the probability of traffic accident is 0.62, in $a_2$ area, if the vehicle traveling together is the front of the same lane, the probability of traffic accident is 0.34, in $a_3$ area, if the vehicle traveling together is the front of the same lane, the probability of traffic accident is 0.04.

With the existence of the vehicle traveling together, the probability value of a traffic accident is set to be equal to $P_{WD}$. Then, the formula of the fuzzy event probability measurement $WD_F$ of the probability information about distance between is considered as follows:

$$WD_F = \left| 1 - \left[ \frac{20}{d_0 - (s_1 - s_2)t} \right]^2 \right| (1 - P_{WD})$$ [Formula 24]

In this way, a state of the automatic drive car in the course of driving is described dynamically by a formula, which can obtain the running in accordance with "machine consciousness", and many kinds of road conditions can be summarized into a formula, which can reduce the complexity of the control system.

In the concrete control of automatic drive car, fuzzy inference should be introduced. The format of fuzzy inference is as follows: If the speed of the automatic drive car $C_1$ is less than the optimal speed value OS, and the distance WD between automatic drive car $C_1$ and the vehicle $C_2$ traveling together is less than the threshold value T, and WD" value of right lane is greater than and equal to the threshold value T for the vehicle $C_2$" traveling together, then the automatic drive car can change lanes to the right lane.

$$OS = \left| 1 - \frac{s_1}{60} \right|$$ [Formula 25]

Similarly, if the speed of the automatic drive car $C_1$ is less than the optimal speed value OS, the distance WD between the automatic drive car $C_1$ and the vehicle $C_2$ traveling together is less than the threshold value T, and the WD' value of left lane is greater than and equal to 100 for the vehicle $C_2$' traveling together, then the automatic drive car can change to the left lane.

The fuzzy inference can also be expressed as follows: If the distance WD between the automatic drive car $C_1$ and the vehicle $C_2$ traveling together in front of the same lane approaches the dangerous area $a_3$, and the distance WD between the automatic drive car $C_1$ and the vehicle $C_3$ traveling together behind the same lane also approaches the dangerous area $a_3$, the WD' value of the left lane is greater than and equal to the threshold value T for the vehicle $C_2$' traveling together. The automatic drive car can then change to the left lane. Alternatively, the value WD" of the right lane is greater and equal to the threshold value T for the vehicle $C_2$" traveling together, such that the automatic drive car change to the right lane.

Although the above control method is similar to the knowledge base, because each condition corresponds to a membership function, each formula can cover many kinds of road conditions, and so the number of rules can be greatly compressed.

The automatic drive car mainly embodies two kinds of "machine consciousness", which describes the automatic driving process with a membership function according to the traffic rules. Through fuzzy inference, the relationship is produced by the complicated road conditions around the driving process, and "machine consciousness" forms a kind of automatic driving control based on complex road condition relation to be able to put forward the best state instruction decisively.

This invention also proposes the use of antagonistic learning to carry out the "machine consciousness" control. Here, the fuzzy event probability measurement $FP_{-f}$ is set for the automatic drive car $C_1$, which needs to speed-up and move forward to approach the front vehicle traveling together. $FP_{-f}$ is set for the fuzzy event probability measurement far away from the vehicle traveling together in the front. $FP_{-b}$ is set for the fuzzy event probability measurement which needs to slow down and move forward to approach the vehicle traveling together on the back. On the other hand, $FP_{-b}$ is set for the fuzzy event probability measurement far away from the vehicle traveling together on the back.

In addition, $FP_1$ is set for the fuzzy event probability measurement for $C_1$ to change to the left lane. $FP_{-1}$ is set for the fuzzy event probability measurement for $C_1$ that can't change to the left lane. Similarly, $FP_{-r}$ is set for the fuzzy event probability measurement for $C_1$ to change to the right lane, and $FP_{-r}$ is set for the fuzzy event probability measurement, for $C_1$ that can't change to the right lane.

Referring to FIG. 13, the fuzzy event probability measurement $FP_f$ wherein the automatic drive car $C_1$ needs to speed-up and move forward to approach the front vehicle traveling together depends on the fuzzy event probability measurement $WD_F$ (formula) of the distance from the vehicle traveling together in the front. The speed $s_1$ of the automatic drive car $C_1$ is lower than the required speed $S_s$; The distance of the rear vehicle traveling together is too close to the nearest distance $D_{S13}$, and is always in a state of proximity for a certain period of time.

$$FP_f = w_{71}(WD_{F12}) \cup w_{72}\left(1 - \frac{1}{\omega_{73}(S_s - s_1)^2} \cap 1\right)$$ [Formula 26]
$$\cup w_{74}\left(1 - \frac{1}{\omega_{75}|[d_0 - (s_1 - s_2)t] - D_{S13}|^2}\right)$$

Wherein, $\omega 71 \sim \omega 75$ is the weight of each factor, which needs to be chosen in practice. In addition, the fuzzy event probability measurement $FP_{-f} = 1 - FP_f$ is far away from the vehicle traveling together in the front.

Referring to FIG. 13, the fuzzy event probability measurement $FP_b$ required for a deceleration close to the rear the vehicle traveling together is formalized. The $FP_b$ value depends on the distance $D_{S12}$ between the automatic drive car $C_1$ and the vehicle traveling together in the front, which is too close and needs to be pulled away. The speed $s_1$ of the automatic drive car $C_1$ is higher than the required speed $S_s$, and the speed of the vehicle $C_3$ traveling together on the back is slower than the required speed $S_s$.

$$FP_b = w_{81}\{1 - \omega_{82}\{[d_0 - (s_1 - s_2)t] - D_{S12}\}^2\} \cap 1 \cup \qquad \text{[Formula 27]}$$

$$w_{83}\left(1 - \frac{1}{\omega_{84}(s_1 - S_s)^2} \cap 1\right)$$

$$\cup w_{85}\left(1 - \frac{1}{\omega_{86}(S_s - s_3)^2} \cap 1\right)$$

Wherein, $\omega_{81} \sim \omega_{86}$ is the weight of each factor and needs to be chosen in practice. In addition, $FP_{\_b}=1-FP_b$ is the fuzzy event probability measurement of far away from the vehicle $C_1$ traveling together in the back.

Referring again to FIG. 13, the fuzzy event probability measurement $FP_l$ for $C_1$ that needs to change to the left lane is formalized. The $FP_l$ value depends on the certain distance $WD_{F2'}$ between the automatic drive car $C_1$ and the vehicle $C_2'$ traveling together on the left side of the automatic drive car. The speed of the automatic drive car $C_1$ is lower than the required speed $S_s$, and the distance $[d_0-(s_1-s_2)T]$ between the automatic drive car $C_1$ and the vehicle $C_2$ traveling together on the front is too close. Further, the distance $[d_0-(s_1-s_2")T]$ between the automatic drive car and the vehicle traveling together of the right lane $C_2"$ is also too close. In addition, the $FP_l$ value depends on the certain distance between the automatic drive car $C_1$ and the vehicle $C_2'$ traveling together on the left side of the automatic drive car, the distance $[d_0-(s_1-s_2)T]$ from the vehicle $C_2$ traveling together in the front is too close. At the same, the distance $[d_0-(s_1-s_3)T]$ from the vehicle $C_3$ traveling together in the back of the automatic drive car is also too close.

[Formula 28]

$$FP_l = \left[w_{91}(WD_{F12'}) \cap \right.$$

$$w_{92}\left(1 - \frac{1}{\omega_{93}(s_1 - S_s)^2} \cap 1\right) \cap w_{94}\left(1 - \frac{[d_0 - (s_1 - s_2)t]^2}{\omega_{95}} \cap 1\right) \cap$$

$$w_{96}\left(1 - \frac{[d_0 - (s_1 - s_2")t]^2}{\omega_{97}} \cap 1\right)\right] \cup \left[w_{98}(WD_{F12'}) \cap \right.$$

$$\left. w_{99}\left(1 - \frac{[d_0 - (s_1 - s_2)t]^2}{\omega_{100}} \cap 1\right) \cap w_{101}\left(1 - \frac{[d_0 - (s_1 - s_3)t]^2}{\omega_{102}} \cap 1\right)\right]$$

Wherein, $\omega_{91} \sim \omega_{102}$ is the weight of each factor, which needs to be chosen in practice. In addition, $FP_{\_l}=1-FP_l$ is the fuzzy event probability measurement the automatic drive car can't change to the left side lane.

Finally, the fuzzy event probability measure $FP_r$ for $C_1$ that needs to change to the left lane is set. The $FP_r$ value depends on the certain distance between the automatic drive car $C_1$ and the vehicle $C_2"$ traveling together on the right side. The speed $s_1$ of the automatic drive car $C_1$ is lower than the required speed $S_s$ and the distance between the automatic drive car $C_1$ and the vehicle $C_2"$ traveling together on the front side is too close. In addition, the $FP_l$ value depends on the certain distance between the automatic drive car $C_1$ and the vehicle $C_2"$ traveling together on the right side. The distance from the vehicle $C_2$ traveling together on the front is too close and the distance from the vehicle $C_3$ traveling together in the rear side is also too close.

[Formula 29]

$$FP_r = \left[w_{111}(WD_{F12"}) \cap w_{112}\left(1 - \frac{1}{\omega_{113}(s_1 - S_s)^2} \cap 1\right) \cap \right.$$

$$w_{114}\left(1 - \frac{[d_0 - (s_1 - s_2)t]^2}{\omega_{115}} \cap 1\right)\right] \cup \left[w_{116}(WD_{F12"}) \cap \right.$$

$$\left. w_{117}\left(1 - \frac{[d_0 - (s_1 - s_2)t]^2}{\omega_{118}} \cap 1\right) \cap w_{119}\left(1 - \frac{[d_0 - (s_1 - s_3)t]^2}{\omega_{120}} \cap 1\right)\right]$$

Wherein, $\omega_{111} \sim \omega_{120}$ is the weight of each factor, which needs to be chosen in practice. In addition, $FP_{\_r}=1-FP_r$ is the fuzzy event probability measure wherein the automatic drive car can't change to right lane.

The formulas 13~38 actually describe the dynamic safe driving state of an automatic drive car in a straight lane, wherein the state varies with the change of speed and the distance the automatic drive car travels. This application proposes to decide whether the automatic drive car $C_1$ speeds up and moves forward toward the vehicle traveling together in the front, or slows down and moves forward relative to the vehicle C traveling together, or change to the left lane, or change to the right lane by antagonistic learning.

Figure 14:
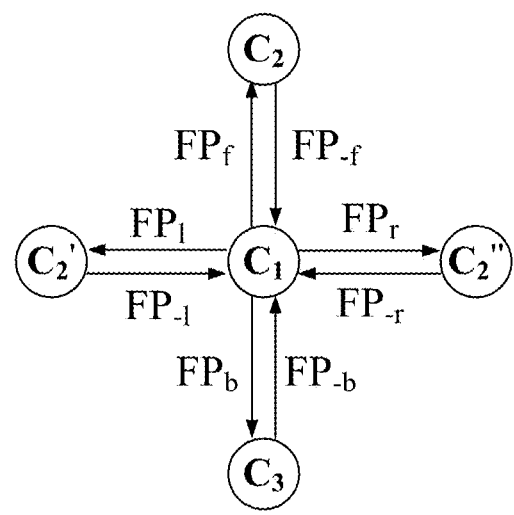
FIG. 14 is a schematic diagram of the machine decision-making mechanism.

FIG. 14 shows a Schematic Diagram of the Machine Decision-making Mechanism.

The machine decision-making mechanism is proposed here, as shown in FIG. 14; Method of making "machine consciousness" is formed by machine decision-making mechanism. In the straight lane, in the complicated relationship between the passing vehicles, in order to decide whether the automatic drive car speeds up, or slows down to approach the rear car, or changes lanes to the left lane or to the right lane, a linear, decisive and optimal judgment is necessary, so the introduction of machine decision-making mechanism is introduced to carry out the processing of "machine consciousness".

As shown in FIG. 14, the acceleration speed of an automatic drive car $C_1$ is related to the $FP_f$ value, and also is related to the fuzzy time probability value $FP_{\_b}$ wherein the automatic drive car doesn't slow down and approach, the fuzzy time probability value $FP_{\_l}$ wherein the automatic drive car doesn't change to the left lane, and the fuzzy time probability value $FP_{\_r}$ wherein the automatic drive car doesn't change to the right lane. When $(FP_f+FP_{\_l}+FP_{\_r}) \geq (FP_b+FP_{\_f}+FP_{\_l}+FP_{\_r})$, the fuzzy probability measure $FP_f'$ wherein the automatic drive car $C_1$ decelerates is set to be "1", then the fuzzy probability measurement $FP_b'$ wherein the automatic drive car $C_1$ accelerates backward is:

$$FP_b' = \frac{FP_b + FP_{\_f} + FP_{\_1} + FP_{\_r}}{FP_f + FP_{\_b} + FP_{\_1} + FP_{\_r}} \qquad \text{[Formula 30]}$$

In this way, the information of positive and negative directions can be used together, which is the result of a strong antagonistic learning between the positive and negative directions, such that optimal, precise and decisive decision-making can be realized. Then, the concept of "machine decision-making mechanism" is produced. In the same way, when $(FP_f+FP_{\_b}+FP_{\_1}+FP_{\_r})<(FP_b+FP_{\_f}+FP_{\_1}+FP_{\_r})$, the fuzzy probability measure $FP_b'$ wherein the automatic drive car $C_1$ decelerates is set to be "1", then the fuzzy probability measurement $FP_f'$ wherein the automatic drive car $C_1$ accelerates ahead is:

$$FP'_f = \frac{FP_f + FP_{-b} + FP_{-1} + FP_{-r}}{FP_{-f} + FP_b + FP_{-1} + FP_{-r}} \quad \text{[Formula 31]}$$

Because, it is clearly stated in traffic management rules that cars do not change lanes frequently, whether the automatic drive car $C_1$ changes lanes to the left lane depends not only on the relation with the fuzzy event probability measurement between the automatic drive car $C_1$ and the vehicle traveling together in left lane, but also on the relation with the straight lane and the vehicle traveling together in the right lane. In accordance with the formalized method mentioned above, when $(FP_1+FP_{-f}+FP_{-b}+FP_{-r}) \geq (FP_f+FP_b+FP_{-1}+FP_r)$, the fuzzy probability measure $FP_1'$ wherein the automatic drive car $C_1$ turns to the left lane is set to be "1", then the fuzzy probability measurement $FP_{-1}'$ wherein the automatic drive car $C_1$ doesn't turns to the left lane $FP_{-1}$ is:

$$FP'_{-l} = \frac{FP_f + FP_b + FP_{-1} + FP_r}{FP_1 + FP_{-f} + FP_{-b} + FP_{-r}} \quad \text{[Formula 32]}$$

In the same way as described above, whether the automatic drive car $C_1$ changes to the right lane, when $(FP_r+FP_{-f}+FP_{-b}+FP_{-1}) \geq (FP_f+FP_b+FP_{-r}+FP_1)$, the fuzzy probability measurement $FP_r'$ wherein the automatic drive car turns to the right lane is set to be "1", then the fuzzy probability measure $FP_{-r}'$ wherein the automatic drive car $C_1$ doesn't turn to the right lane $FP_{-r}$ is:

$$FP'_{-r} = \frac{FP_f + FP_b + FP_{-r} + FP_1}{FP_r + FP_{-f} + FP_{-b} + FP_{-1}} \quad \text{[Formula 33]}$$

Formulas 30-33 are used for the automatic drive car that drives on a straight road. Because the expressions of function $FP_b$, $FP_f$, $FP_1$, $FP_r$ all contain velocity variables, it can be regarded as a function that takes time $\tau$ as an independent variable, that is, $FP_b(\tau)$, $FP_f(\tau)$, $FP_1(\tau)$, $FP_r(\tau)$. Thus, the model $FP_f'$, $FP_b'$, $FP_1'$, $FP_r'$ of the machine decision-making mechanism can also form a function formula for time-dependent variables.

The formula $FP_f'(\tau)$ of fuzzy probability measurement function wherein the automatic drive car $C_1$ accelerates forward is:

$$FP'_f(\tau) = \frac{FP_f(\tau) + FP_{-b}(\tau) + FP_{-1}(\tau) + FP_{-r}(\tau)}{FP_{-f}(\tau) + FP_b(\tau) + FP_{-1}(\tau) + FP_{-r}(\tau)} \quad \text{[Formula 34]}$$

Then the formula $FP_b'(\tau)$ of fuzzy probability measure function wherein the automatic drive car $C_1$ decelerates is:

$$FP'_b(\tau) = \frac{FP_b(\tau) + FP_{-f}(\tau) + FP_{-1}(\tau) + FP_{-r}(\tau)}{FP_f(\tau) + FP_{-b}(\tau) + FP_{-1}(\tau) + FP_{-r}(\tau)} \quad \text{[Formula 35]}$$

Then the formula $FP_1'(\tau)$ of fuzzy probability measurement function of the self-driving vehicle $C_1$ changing to the left lane is:

$$FP'_1(\tau) = \frac{FP_{-f}(\tau) + FP_{-b}(\tau) + FP_1(\tau) + FP_{-r}(\tau)}{FP_f(\tau) + FP_b(\tau) + FP_{-1}(\tau) + FP_r(\tau)} \quad \text{[Formula 36]}$$

Then the formula $FP_r'(\tau)$ of fuzzy probability measurement function of the automatic drive car $C_1$ changing wherein the automatic drive car to the right lane is:

$$FP'_r(\tau) = \frac{FP_{-f}(\tau) + FP_{-b}(\tau) + FP_{-1}(\tau) + FP_r(\tau)}{FP_f(\tau) + FP_b(\tau) + FP_1(\tau) + FP_{-r}(\tau)} \quad \text{[Formula 37]}$$

This makes it possible to predict which section of the automatic driving is a safe driving area and which section will start to be dangerous; this is a "machine consciousness" model of the automatic driving dynamic process control. The above-mentioned "machine consciousness" model can predict the state that the automatic drive car will travel, and it calls the "Smart Grains" data to form a harmonious control process. It also conforms with the three-dimensional mechanism of the sensing layer, the judging layer and the executing layer of the biological nerve.

The "machine consciousness" model of automatic driving is constructed and established according to safety driving rules, and based on the dynamic fuzzy event probability measurement relation between the automatic drive car and another vehicle traveling together; or on fuzzy relations; or on the probability relation. It is constituted through the membership function that incorporates the traffic rules, the risk prediction rules, the risk avoidance rules. This is realized by making use of the antagonistic result of the fuzzy event probability measurement of the positive and negative directions, or fuzzy relations, or probability relations.

The above-mentioned "machine consciousness" model is a machine decision-making mechanism which divides the process of operating the automatic drive car into several different road conditions during driving.

Next, in the face of the control characteristics of the automatic driving system proposed by this invention, it is necessary to consider how to bypass the complicated NP problem of the automatic driving, and the traditional control method should set the threshold value to control each control point. So with at least dozens of road conditions, each of which has dozens of control points to adjust, this is a typical NP problem in combinatorial theory and is a problem that the Turing machine cannot solve.

In order to solve the NP problem of the automatic drive car in complex control, this invention proposes to bypass the NP problem of automatic driving in complex control by using the method that machine learns from human, and this learning can generate all kinds of automatic driving knowledge, and machine achieves "Smart Gains" from human and the machine can produce "wisdom", then the automatic drive car can achieve the most human-like control results of "Smart Gains", which greatly simplifies the complexity of automatic drive car, thus the control of automatic drive car gets rid of the complex NP problem and it is hoped that automatic drive car system with the effect of Turing test can be realized.

Figure 15:
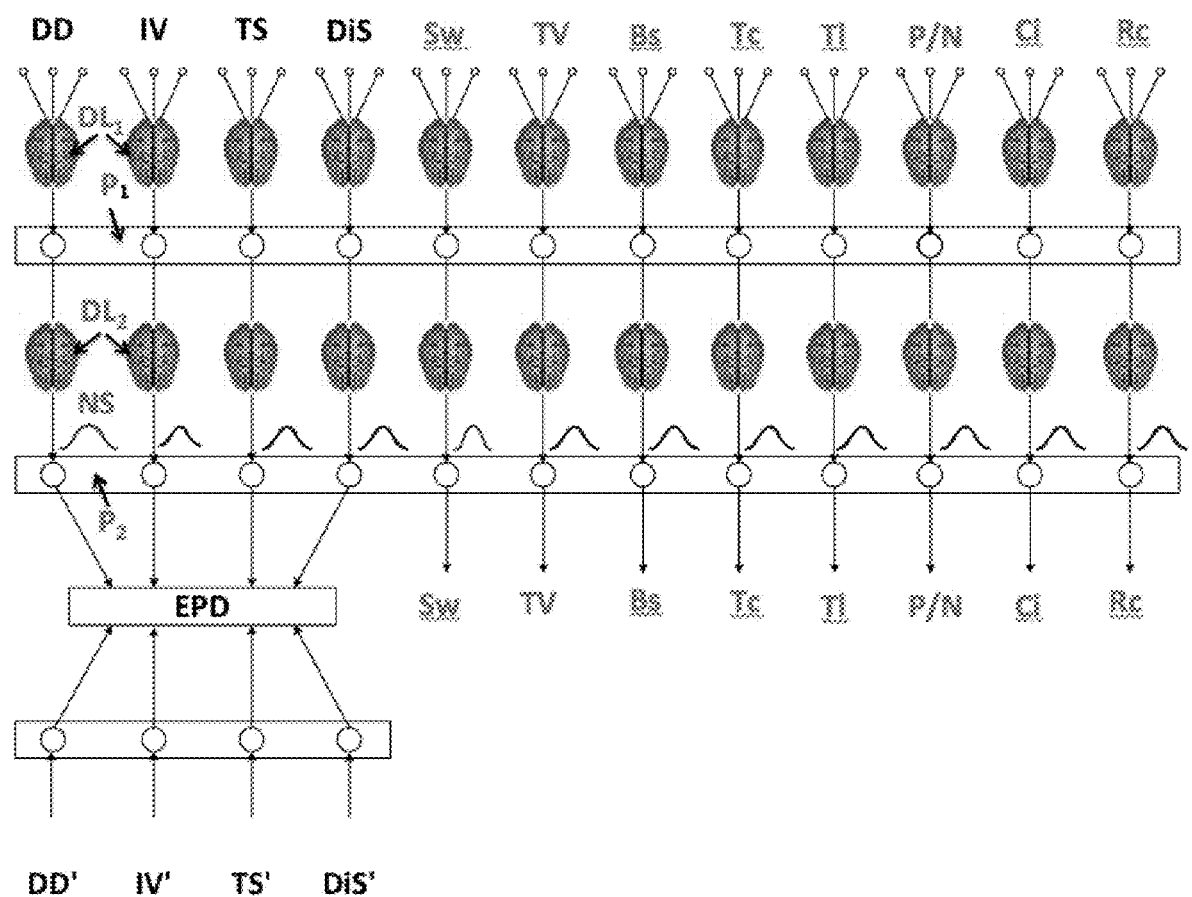
FIG. 15 is a schematic diagram of the "smart gains" for the process control of an automatic drive car.

FIG. 15 shows a schematic diagram of the "Smart Gains" for the process control of the automatic drive car.

As shown in FIG. 15, driving distance (DD), initial velocity (IV), target speed (TS) and the current walking distance (the position of the monitoring point in the driving process) Dis are search items; control items include steering wheel angle (Sw), throttle size (Tv), Braking condition (BS), driving direction (P/N), turn control (Tc), turn light (Tl), control interval (Ci), road condition type (RC), etc.

Probability scale self-organizing machine learning $DL_1$ is responsible for determining the maximum probability value in the training data of plural automatic drive cars, which is input to the nodes of the sensing layer ($P_1$) and connected to the sensing layer and the neural layer ($P_2$) probability scale self-organizing machine learning $DL_1$ which is responsible for determining the maximum probability distribution with plural training data and eliminating the incorrect training data, and identifying and establishing the new training data processing. When the calculating data are beyond a certain range through the calculation of the distance Formula (10) which can unify Euclidean space and probability space, and the fuzzy event probability measurement formula (11) which can be used in different spaces, it will be put into the storage space to be observed. If there are some similar training results with this data in the subsequent training, these data form new "Smart Gains" result by the probability scale self-organizing machine learning; otherwise the data will be removed.

EPD is the storage space set up for data retrieval. According to the state instruction of "acquisition of consciousness", the contents of the EPD database are retrieved, and the data of the control project is taken out to control the driving of automatic drive car. The specific retrieval methods are as follows: By distance Formula (10) that can unify Euclidean space and probability space, and the fuzzy event probability measurement Formula (11) of different spaces, the distance between the driving requirements required by the state instruction of "acquisition of consciousness" and the probability distribution of the data in EPD database, or the fuzzy event probability measurement is calculated. Then, the closest database of machine learning "Smart Gains" in the process control of the automatic driving can be obtained and the automatic drive car can be controlled by using data of each control item. In addition, there are also gyroscopes to control the attitude of automatic driving, positioning, and lane and so on.

The "Smart Gains" of automatic driving is to solve the problem of driving skills that the machine learns from a human. It can simplify the control of complicated automatic driving, so a lot of training is needed to train automatic drive car system in advance, so that "Smart Gains" has enough knowledge to face various driving conditions.

The method of obtaining training such that the automatic driving constitutes "Smart Gains" data is that the relation between an automatic drive vehicle and another vehicle traveling together, or a state instruction given by road condition is obtained by the "machine consciousness" unit. After the "Smart Gains" unit receives one of the above-mentioned state instructions, at least one information including steering wheel information, throttle information, brake information, gear information, turn indicator light information, which are produced on the training of the automatic drive car, is registered and the database of "Smart Gains" is constituted.

The above mentioned relationship between a certain and the passing vehicle obtained by the "machine consciousness" refers to: at least one of the fuzzy event probability measurement relation including fuzzy relation, probability relation, and the relation of distance between the vehicles.

The above mentioned "Smart Gains" data is that in the same "machine consciousness" instruction, the plurality of data after plural training is obtained, through probability scale self-organizing machine learning, the maximum probability value of training data; Maximum probability space of training data; Maximum probability distribution of training data is obtained.

The maximum probability value of training data is the control value identified as "Smart Gains" unit, as the basis of judging the training quality, choosing training results and establishing new "Smart Gains" data. The maximum probability distribution of training data is considered as the redundancy of automatic driving in control and the necessary condition for data retrieval with probability distribution property of the establishment of sample data and login.

The control method of automatic driving importing into the "Smart Gains" model is that through "machine consciousness", the relation between a certain the automatic drive car and a passing vehicle based on the training data, or a state instruction of road condition is obtained. After obtaining the above-mentioned state instruction, the "Smart Gains" data corresponding to that state instruction is obtained, and the driving of the automatic drive car is controlled in accordance with the "Smart Gains" data.

The above mentioned relationship between the automatic drive car and the passing vehicle obtained by the "machine consciousness" refers to: at least one of the fuzzy event probability measurement relations including fuzzy relation, probability relation, and the relation of distance between the vehicles.

The "Smart Gains" data corresponding to this state mentioned above refers to the calculation for the instruction condition given by "machine consciousness" and the data in the "Smart Gains" database through the distance formulas that unify the distance between the Euclidean space and probability space, or the fuzzy event probability measurement formulas, and the distance is found out or the "Smart Gains" data of the smallest measurement is taken as the control data.

On the principles of providing a "comfortable ride" proposed by human engineering, acceleration is controlled by the automatic driving; or the deceleration is controlled to not exceed $\pm x[m/s^2]$, or not exceed the acceleration of $y$ $[m/s^3]$ to avoid giving people some uncomfortable ride and achieve the effect of "comfortable ride".

The realization of automatic driving control is by no means a mere call of "Smart Gains" data. According to the theory of self-regulating decentralized control, the control of automatic driving has independent control ability. In one kind of road condition, all kinds of accidental events will appear randomly, so it is necessary to have all kinds of information of the sensing layer in the function unit of "Smart Gains" while also being able to autonomously carry out driving of the automatic drive car under certain ranges and conditions without the function unit of "machine consciousness".

The "Smart Gains" data is continuously controlled according to the distance measured by the gyroscope during the process of driving the automatic drive car, and the "Smart Gains" is achieved by the data collection during the training according to the distance measured by the gyroscope. The driving process of the automatic drive car is also based on this interval to read the "Smart Gains" data and catty out the control of the corresponding parameters.

The control of the automatic drive car is not only simply to read the "Smart Gains" data and carry out the control according to "Smart Gains" data, as a self-regulated decentralized control system. When the automatic drive car carries out reading of the "Smart Gains" data and the necessary control according to the "Smart Gains" data, the information from the sensing layer is also received. The possible occurrence of various events can be independently judged according to the occurrence of sudden events, or the possibility of the occurrence of sudden events such that appropriate treatment is given.

In the control of the automatic driving vehicle, according to the Gaussian process machine learning model of maximum probability, it solves the course angle and speed regulated by the maximum probability of the driving track of the automatic driving vehicle. With the control based on the prior knowledge of the operation process values of the steering wheel, throttle and the brake of maximum probability, it solves the difference of course angle and speed regulated between the track of automatic driving adjusted by the prior knowledge and the maximum probability of the driving track of automatic driving vehicle. The course angle and speed of automatic driving vehicle are adjusted repeatedly with this difference until the course angle and speed are the same as that of the maximum probability of the automatic driving track.

A control device of automatic driving that imports "Smart Gains" data is composed of the decision information module accepting "machine consciousness", the data module calling the "Smart Gains" data and the driving module controlling the automatic driving vehicle. The decision information module accepting "machine consciousness" is in charge of accepting the information about the distance, relative speed, and position of the passing vehicle around the automatic driving vehicle provided by the sensory perceptual system through a "machine consciousness" decision system. Through the description of the mathematical method, and the complex logic operation and the logic antagonistic result, control instructions are generated and given.

The data module calling the "Smart Gains" data, after obtaining the above-mentioned state instruction, calls the data corresponding to the state instruction, and obtains the "Smart Gains" data through the Gaussian process machine learning of maximum probability. The driving module controls the automatic driving vehicle according to the "Smart Gains" data which includes steering wheel, throttle and brake data, through the prior knowledge constituted by the Gaussian process machine learning of maximum probability, and with closed-loop control, the driving module drives the automatic driving vehicle automatically according to the driving track of the "Smart Gains" data.

Figure 16A:
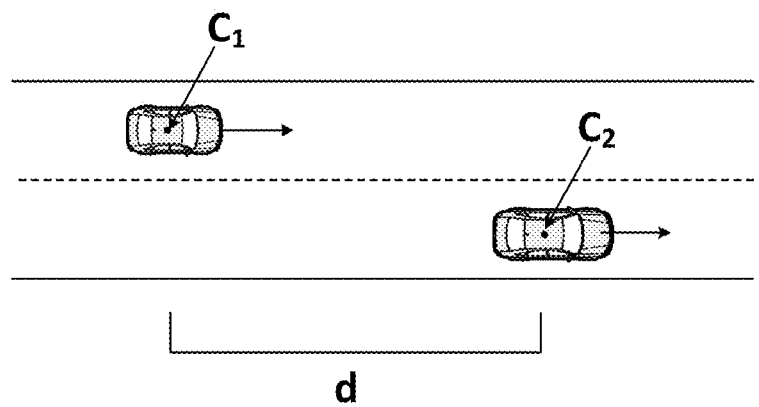
FIGS. 16(a)-16(b) are schematic diagrams of possible situations during automatic drive.
Figure 16B:
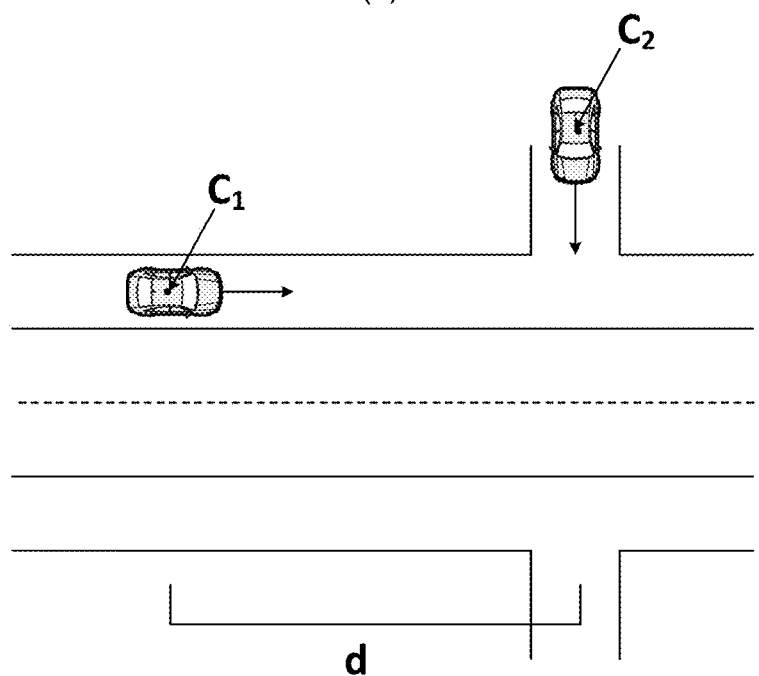

FIGS. 16(a) and 16(b) show a schematic diagram of the possible situations during automatic driving. FIG. 16(a) shows that the automatic drive car $C_1$ is about to pass through the bus $C_2$ that has just stopped in the right lane. It is the blind area in the front of the bus that the automatic drive car cannot see. In the control unit of the automatic drive car, the case should be considered that if passengers run out from the front of the bus, the automatic drive car can carry out an emergency stop.

FIG. 16(b) shows that the automatic drive car $C_1$ is about to pass through a crossroads without lights. On another road in the left of the crossing, there is a vehicle $C_2$ traveling together coming towards the crossroads and the vehicle $C_2$ traveling together is located in a blind area for the automatic drive car. As automatic drive car $C_1$, the possibility of a traffic accident should be considered in that the vehicle $C_2$ traveling together may move out into the crossroads, such the automatic drive car $C_1$ should ensure that even if the vehicle $C_2$ traveling together does move out into the crossroads, a traffic accident can be avoided.

However, during the driving of the automatic drive car, there are many places like these which may cause traffic accidents. If they are not handled well, very uncomfortable situations during the driving may occur. How to make the automatic drive car consider the machine consciousness and still provide a comfortable ride is important. However, because the probability that a passenger runs out from the front bus is very small, the "Smart Gains" data must be designed such that humans teaching the machines to drive should consider training data according to the distance between the automatic drive car and the bus, the current speed and proximity to the front of the bus. Thus, even if there are passengers running out, emergency braking can be done to ensure that no accident occurs, and the best comfortable ride can still be provided.

The method to solve this problem is as follows: First of all, the machine learning should consider initial speed, target speed, driving distance, terminal speed and other driving conditions, as well as how to satisfy the "safety rules" at the same time; how to "ride comfortably"; and how to ride comfortably while realizing "quick arrival". Data on all these factors are all generated by teaching the machine to form a large number of "Smart Gains" data from human training, and carrying out the fusion with the driving route that the "Smart Gains" data wants to drive and the driving route that the "machine consciousness" predicts.

Here, another way to teach a good driver's driving skills is provided to the automatic drive car through the "Smart Gains" data generated by machine learning, and through the above state instruction given by "machine consciousness". As a result, a "comfortable ride" by the automatic drive car should be smoothly carried out, and the complex NP control problem faced by the automatic drive car should be solved.

In solving the complexity of the various driving processes, it is proposed that, through machine learning, the machine can learn various driving skills from human training, learn how to face the state instructions of each "machine consciousness", and learn how to turn every driving state to "running flow" smoothly, which also depends on the learning that the machine obtains from human training. In this guiding ideology, multi-purpose control of "safe driving", "comfortable ride" and "fast arrival", "energy saving" can be realized.

Figure 17:
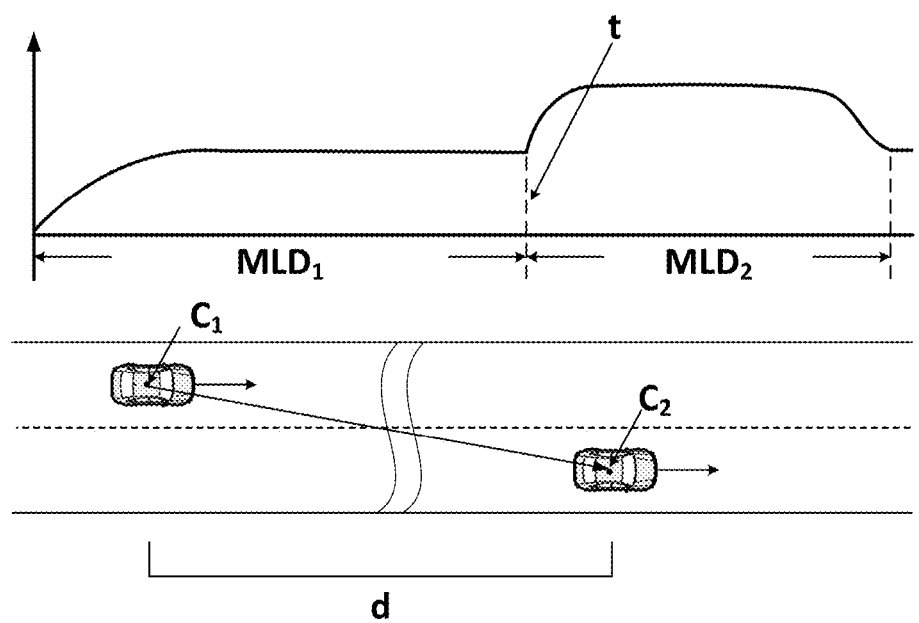
FIG. 17 shows a schematic diagram of the fusion method of "smart gains" and "machine consciousness".

FIG. 17 shows a schematic diagram of the fusion method for "Smart Gains" and "machine consciousness". This invention proposes the integration of the four objective functions of "Smart Gains", "machine consciousness", "comfortable ride" and "fast arrival". First, relying on "Smart Gains", during the man-machine learning, the data after learning has the characteristics of "comfortable ride" and "fast arrival" as far as possible, and the man-machine learning can be carried out in various driving conditions, so that the passengers can enjoy the pleasure of a "comfortable ride". Through training with an excellent driver's driving skills, these driving skills are taught to the automatic drive cars. As shown in FIG. 17, under normal circumstances, the automatic drive car drives according to "Smart Gains" data $MLD_1$. When the automatic drive car $C_1$ enters the area of the vehicle $C_2$ traveling together, "machine consciousness" proposes to exceed the area of the vehicle $C_2$ traveling together, based on the given time that exceeds the area of the vehicle $C_2$ traveling together, and the required speed. That is, when the automatic drive car $C_1$ is at the t hour, "machine consciousness" calls the "Smart Gains" data $MLD_2$ for a higher speed, and for paying attention to providing a "comfortable ride", the "machine consciousness" will call the data $MLD_2$ early and the increase in speed will be changed slowly.

For the objective function of "comfortable ride", it can be realized according to the theory of co-learning, the vibration of acceleration and deceleration of over ±7 [m/s$^2$] of automatic drive car, or the acceleration vibration of about 10 [m/s$^3$] will give people some uncomfortable feeling of ride. The "comfortable ride" effect can be achieved by avoiding the above-mentioned unsuitable "comfortable ride" in the process of acceleration and deceleration.

The second method of fusion of the four objective functions of "Smart Gains", "comfortable ride" and "fast arrival" proposed by this invention is that using the principle of "comfortable ride" proposed by the above-mentioned theory of co-learning to revise the "machine consciousness" data, the Smart Gains" data and "machine consciousness" data are made to meet the "comfortable ride" requirements.

The second method of fusion of the four objective functions of "Smart Gains", "comfortable ride" and "fast arrival" proposed by this invention is as follows: On the driving curve obtained in "Smart Gains", the driving curve obtained in "machine consciousness", and the driving curve obtained in "comfortable ride", through the least square law, the best approximation of the three curves is carried out to make the automatic drive car drive according to the curve after the function approximation. Alternatively, through the maximum probability self-organizing unsupervised machine learning shown in FIG. 5, the maximum probability value of each discrete point of the three curves is calculated to make the automatic drive car drive according to the curve connected by the maximum probability value. The spline function can be used to do the polishing processing. The antagonistic learning of FIG. 14 relying on the four objective functions of "Smart Gains", "machine consciousness", "comfortable ride", and "fast arrival" can also be obtained.

The concept of antagonistic learning is that when the probability distribution of data obtained on the spot, such as speed, acceleration, and fast destination arrival is approached, and the distance of the probability distribution of energy consumption and safe driving is remote, then the mediation is carried out in the direction of being advantageous to the negative. Conversely, when the distance of the probability distribution of acceleration and fast destination arrival is remote, and the distance of the probability distribution of energy consumption and safe driving is approached, then the mediation is carried out in the direction of being advantageous to the positive, so as to achieve the multi-purpose control of antagonistic learning and make the automatic drive car stay in the optimal control state.

Here, the above "machine consciousness" and "Smart Gains" to put forward specific training methods for automatic drive cars is summarized.

A running state can simultaneously control the throttle acceleration and deceleration, control the steering wheel to turn the automatic driving car, control the brake to make it slow down or stop, control the gear shift to make the car go forward or backward, control the turn direction indication and so on. A running state will maintain its running state without receiving the information of changing the running state issued by the decision-making layer, or when it encounters a sudden state, such as the completion of a current state, in which case the automatic driving car can enter into the next running state according to the state instructions of the "machine consciousness" unit.

It is proposed that the state information of an automatic drive car received by the "machine consciousness" function unit mounted within the automatic drive car be based on training data derived from an excellent driver driving a vehicle, such as the distance between the automatic drive car and the vehicle traveling together, the speed between the automatic drive car and the vehicle traveling together, etc.

The formed road conditions of "machine consciousness", in different road conditions, are put into data including the excellent driver control of the throttle acceleration and deceleration, the data that makes the automatic drive car turn controlling the steering wheel, the data that controls the brake to slow down or stop, the data that controls the shift to go ahead or backward, and the data that controls the turning direction indication into the database. The road information of the "machine consciousness" is used to divide the continuous training of the automatic drive car by the excellent driver into each road condition. With each road condition, the data corresponding to the excellent driver controlling the throttle acceleration and deceleration, the data that makes the automatic drive car turn when controlling the steering wheel, the data that controls the brake to slow down or stop, the data that controls the shift to go ahead or backward, the data that controls the turning direction indication, etc. are obtained to constitute the "Smart Gains" data for the automatic drive car control. This carries out the training for the automatic drive car automatically and makes the automatic drive car obtain the knowledge taught by human training, and thus produce the machine's wisdom. The automatic drive car can have certain driving skills similar to a human, which can reduce the complexity of controlling an automatic drive car, and bypass the NP problem caused by the complexity of controlling an automatic drive car.

The control method of the automatic driving car, in turn, the automatic drive car, through the training by good drivers, has achieved control data under various road conditions and realized "Smart Gains. Therefore, according to the "machine consciousness" unit and the state instructions given by various road conditions, the corresponding "Smart Gains" data is called to control the driving of the automatic drive car.

The definition method of the above-mentioned membership function can also be defined in various ways according to the thought of the invention, but in the application to automatic drive cars, the use of fuzzy mathematics to solve the control of the automatic drive car is within the scope of the invention.

In addition, there can be a variety of components in the way of machine learning, but in the automatic driving, by machine learning, the relevant data of driving training through the good drivers' driving process is recorded, and the "Smart Gains" data is formed as the control data for various road conditions of the automatic drive car, all of which are within the scope of the invention.

In addition, the "machine consciousness" formed by safety rules may also have various forms, and any theory that adopts the theory of fuzzy mathematics shall all be within the scope of the invention.

The foregoing discussion discloses and describes merely exemplary embodiments of the present invention. One skilled in the art will readily recognize from such discussion, that various changes, modifications and variations can be made therein without departing from the spirit and scope of the invention as defined in the present disclosure. Furthermore, while exemplary embodiments have been expressed herein, others practiced in the art may be aware of other designs or uses of the present invention. Thus, while the present invention has been described in connection with exemplary embodiments thereof, it will be understood that many modifications in both design and use will be apparent to those of ordinary skill in the art, and this application is intended to cover any adaptations or variations thereof. It is therefore manifestly intended that this invention be limited only by the present disclosure and the equivalents thereof.

What is claimed is:

1. An image extraction method for importing into a Super Deep Learning (SDL) model that comprises the steps of:
   conducting eigenvector generation which includes:
   separating image data to be extracted from original image data, the to-be-extracted image data includes color information, gradation value information, edge information, frequency information, pattern information, and spatial relation information of an image to be extracted,
   determining a complex feature value based on at least one of the to-be-extracted image data,
   performing machine learning of a multi-agent Gaussian process of a maximum probability value using each feature value of the image to be extracted in a maximum probability space to determine at least one eigenvector of the to-be-extracted image data, and
   registering a result of the at least one eigenvector determination in a database; and
   performing image extraction which includes:
   calculating a distance between an eigenvector of a sample image and the at least one eigenvector determination registered in the database, and
   determining a gray-scale value of each color of the image to be extracted in response to the at least one eigenvector determination from which the calculated distance is calculated.

2. The image extraction method for importing into the SDL model according to claim 1, wherein the calculated distance includes a distance scale of at least one space included in Euclidean space and probability space.

3. The image extraction method for importing into the SDL model according to claim 1, wherein the maximum probability value is an iteration result of machine learning for probability scale self-organization.

4. The image extraction method for importing into the SDL model according to claim 3, wherein the maximum probability space is a space enclosed by a maximum probability scale obtained from the iteration result of machine learning for probability scale self-organization.

5. The image extraction method for importing into the SDL model according to claim 3, wherein the step of eigenvector generation further includes determining a maximum probability distribution that comprises the maximum probability value and a maximum probability scale that are obtained from the iteration result of machine learning for probability scale self-organization.

6. The image extraction method for importing into the SDL model according to claim 1, wherein the gray-scale value of each color of the image to be extracted is at least one of a main eigenvalue, which is a difference between the gray-scale value of each color of the image to be extracted and a gray-scale of each color of other images, a ratio between a gray scale of a predetermined color of a lane in the image to be extracted and a maximum gray value of a background in the image to be extracted, a ratio between a gray scale of a predetermined color of a lane in the image to be extracted and a maximum gray value of a background in the image to be extracted, and a gray scale of a predetermined color of the lane in the image to be extracted, wherein a maximum probability value of the gray-scale value which is not the closest to the lane but less than the gray-scale value of the lane and a maximum probability value of the gray-scale value which is not the closest to the lane but more than the gray-scale value of the lane are determined, and wherein the confrontation learning is carried out between two gray-scale values proximate to the gray-scale value of the lane to determine a probability distribution of a difference between the gray-scale value of the lane and the two proximate gray-scale values.

* * * * *